United States Patent
Takayama

(10) Patent No.: US 8,698,793 B2
(45) Date of Patent: Apr. 15, 2014

(54) STORAGE MEDIUM HAVING INFORMATION PROCESSING PROGRAM STORED THEREIN AND INFORMATION PROCESSING APPARATUS

(75) Inventor: Takahiro Takayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1171 days.

(21) Appl. No.: 12/627,724

(22) Filed: Nov. 30, 2009

(65) Prior Publication Data

US 2011/0074768 A1 Mar. 31, 2011

(30) Foreign Application Priority Data

Sep. 28, 2009 (JP) ................................. 2009-223443

(51) Int. Cl.
*G06T 15/00* (2011.01)
(52) U.S. Cl.
USPC .......................................... 345/419; 345/473
(58) Field of Classification Search
None
See application file for complete search history.

(56) References Cited

U.S. PATENT DOCUMENTS

| | | | | |
|---|---|---|---|---|
| 6,097,369 A | * | 8/2000 | Wambach | 345/158 |
| 6,191,773 B1 | * | 2/2001 | Maruno et al. | 345/158 |
| 8,287,373 B2 | * | 10/2012 | Marks et al. | 463/36 |
| 2005/0233866 A1 | * | 10/2005 | Miyamaru et al. | 482/57 |
| 2009/0158220 A1 | * | 6/2009 | Zalewski et al. | 715/863 |
| 2009/0298590 A1 | * | 12/2009 | Marks et al. | 463/37 |

FOREIGN PATENT DOCUMENTS

JP 2004-236799 8/2004

* cited by examiner

*Primary Examiner* — Said Broome
(74) *Attorney, Agent, or Firm* — Nixon & Vanderhye, P.C.

(57) ABSTRACT

Movement means moves, in accordance with a user performing an operation, a moving object including a vehicle object, and a rider object riding the vehicle object, and the vehicle object and the rider object are positioned in the virtual world. Contact determination region defining means defines at least one contact determination region for the moving object. Contact determination means determines a contact in the virtual world by using the at least one contact determination region. Contact action control means selects a foot, of the rider object, which is to contact a contact object positioned in the virtual world, in accordance with a determination result of the contact determination means, and performs control such that the selected foot contacts the contact object. Display control means displays the moving object by using the display device.

20 Claims, 17 Drawing Sheets

F I G. 7
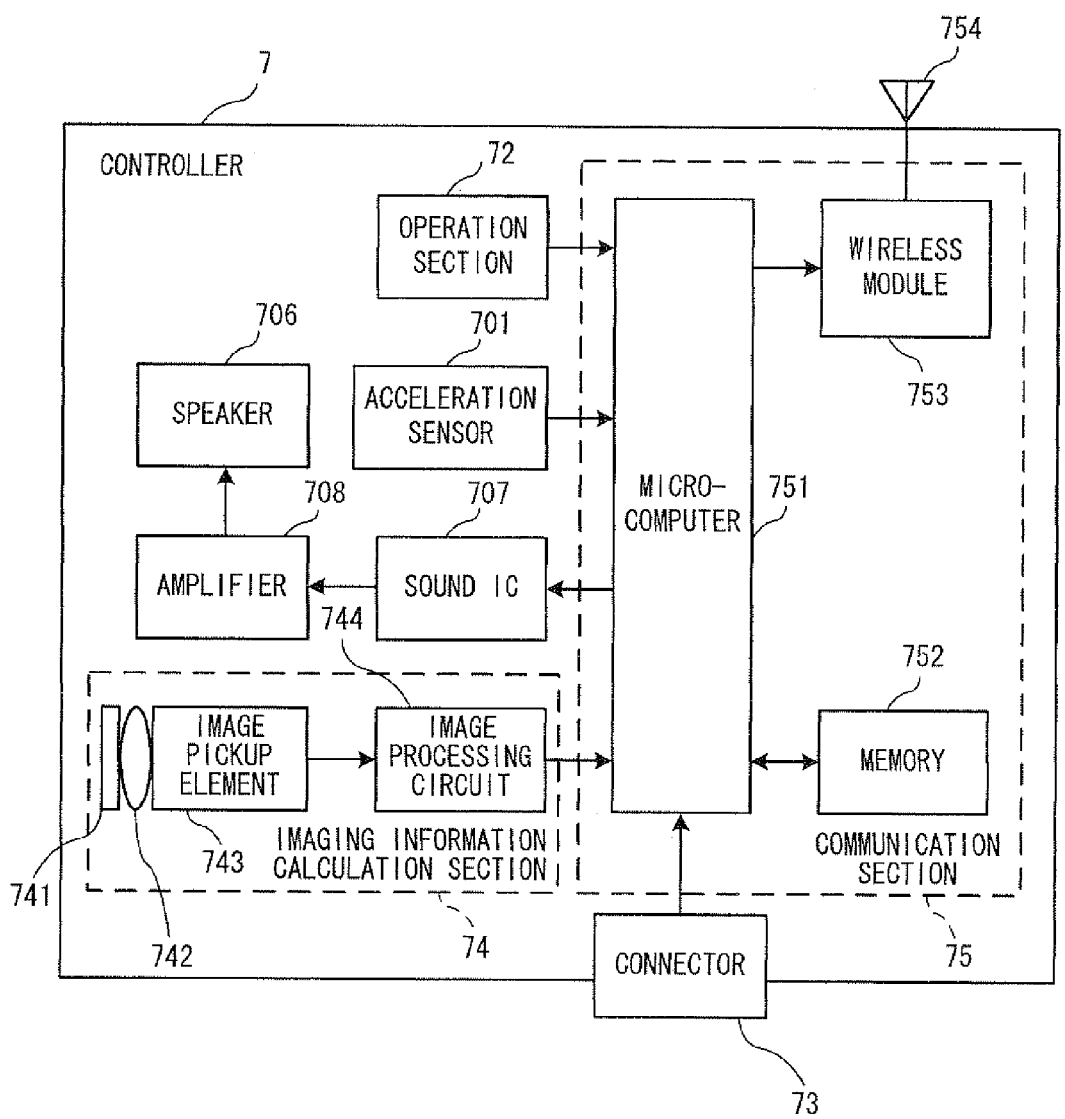

TURN HANDLE
BAR LEFTWARD

TURN HANDLE
BAR RIGHTWARD

STORAGE MEDIUM HAVING INFORMATION PROCESSING PROGRAM STORED THEREIN AND INFORMATION PROCESSING APPARATUS

CROSS REFERENCE TO RELATED APPLICATION

The disclosure of Japanese Patent Application No. 2009-223443, filed on Sep. 28, 2009, is incorporated herein by reference.

BACKGROUND OF THE INVENTION

1. Field of the Invention

The present invention relates to a storage medium having an information processing program stored therein and an information processing apparatus, and more particularly to a storage medium having stored therein an information processing program using a virtual world in which, for example, a vehicle object, and a rider object that operates the vehicle object appear, and an information processing apparatus.

2. Description of the Background Art

Conventionally, as disclosed in, for example, Japanese Laid-Open Patent Publication No. 2004-236799 (hereinafter, referred to as Patent Document 1), known is a game apparatus for controlling, in accordance with an operation performed by a user, a speed at and a direction in which an object moves in a virtual world. According to Patent Document 1, by a speed at and a direction in which a motorcycle corresponding to a moving object moves being controlled in accordance with an operation performed by a user, a competition in lap time from a start to a goal in a course on which the moving object moves is made, or a competition, for order of arrival, with another moving object controlled by a computer is made.

In the game apparatus disclosed in Patent Document 1, a focus is placed on achievement of a game purpose of causing the moving object to reach the goal as quickly as possible, and therefore it is not considered that an animation of the moving object, which is at a stop, is displayed in a natural manner. For example, the moving object includes a vehicle object (motorcycle) which runs on a course defined in a virtual world, and a rider object which rides the vehicle object and operates the vehicle object in the virtual world. However, in the game apparatus disclosed in Patent Document 1, it is not considered that an animation of the rider object on the vehicle object which is at a stop is displayed in a natural manner.

SUMMARY OF THE INVENTION

Therefore, an object of the present invention is to provide a storage medium having stored therein an information processing program for representing a rider object in a natural manner so as to alleviate an unnatural representation of the rider object, and an information processing apparatus.

In order to attain the object mentioned above, the present invention has the following features.

A first aspect of the present invention is directed to a computer-readable storage medium having stored therein an information processing program executed by a computer of an information processing apparatus for displaying a virtual world by using a display device. The information processing program causes the computer to function as: movement means; contact determination region defining means; contact determination means; contact action control means; and display control means. The movement means moves, in accordance with a user performing an operation, a moving object including a vehicle object, and a rider object riding the vehicle object, and the vehicle object and the rider object are positioned in the virtual world. The contact determination region defining means defines at least one contact determination region for the moving object. The contact determination means determines a contact in the virtual world by using the at least one contact determination region. The contact action control means selects a foot, of the rider object, which is to contact a contact object positioned in the virtual world, in accordance with a determination result of the contact determination means, and performs control such that the selected foot contacts the contact object. The display control means displays the moving object by using the display device.

According to the above structure, an unnatural representation of the rider object moving on the vehicle object in the virtual world can be alleviated.

Further, the contact action control means may select a foot, of the rider object, which is to contact the contact object in accordance with a determination result of the contact determination means, and perform control such that the selected foot contacts the contact object when the moving object is stopped.

According to the above structure, an unnatural display representing the rider object when the moving object is stopped in the virtual world can be alleviated.

Further, the contact determination region defining means may define a first contact determination region for the moving object. In this case, the contact determination means may determine whether or not the first contact determination region contacts the contact object. The contact action control means may select, when the contact determination means determines that the first contact determination region contacts the contact object, a foot which is to contact the contact object, and perform control such that the selected foot contacts the contact object.

According to the above structure, a contact action of the rider object can be controlled in accordance with a condition of the contact object which a foot is to contact.

Further, the contact determination region defining means may define a plurality of the first contact determination region for the moving object. In this case, the contact action control means may perform control, when the contact determination means determines that one of the plurality of the first contact determination region defined for the moving object contacts the contact object, such that a foot of the rider object contacts the contact object, the foot of the rider object corresponding to the one of the plurality of the first contact determination region. The contact action control means may perform control, when the contact determination means determines that a region which is among the plurality of the first contact determination region and is other than the one of the plurality of the first contact determination region defined for the moving object contacts the contact object, such that a foot of the rider object contacts the contact object, the foot of the rider object corresponding to the region other than the one of the plurality of the first contact determination region.

According to the above structure, a foot of the rider object which is to contact the contact object can be selected depending on a state in which the first contact determination region corresponding to the feet of the rider object contact the contact object.

Further, the contact determination region defining means may define the first contact determination region on each of a right side and a left side of the moving object, and the number of the first contact determination region defined on each of the right side and the left side of the moving object is at least one. In this case, the contact action control means may perform control, when the contact determination means determines that the first contact determination region defined on the left side of the moving object contacts the contact object, such that a left foot of the rider object contacts the contact object. On the other hand, the contact action control means may perform control, when the contact determination means determines that the first contact determination region defined on the right side of the moving object contacts the contact object, such that a right foot of the rider object contacts the contact object.

According to the above structure, the contact action of the rider object can be controlled in accordance with conditions of the contact object on each of the right and the left sides.

Further, the contact determination means may select, in accordance with a condition of the moving object in the virtual world, one of the first contact determination region on the right side and the first contact determination region on the left side, and determine whether or not the selected one of the first contact determination region contacts the contact object.

According to the above structure, one of the right side and the left side may be checked at a higher priority, in accordance with the condition of the moving object, and therefore the rider object can perform the contact action in accordance with the condition of the moving object.

Further, when the selected one of the first contact determination region does not contact the contact object, the contact determination means may determine whether or not the other of the first contact determination region on the right side and the first contact determination region on the left side contacts the contact object.

According to the above structure, even when a foot cannot contact one of the contact object on the right side of the moving object and the contact object on the left side of the moving object, the foot can contact the other contact object, thereby preventing the moving object from being in a contact impossible state.

Further, the contact determination region defining means may define the first contact determination region on a right lower side position of the moving object, and the first contact determination region on a left lower side position of the moving object, such that the first contact determination region on the right lower side position, and the first contact determination region on the left lower side position are constantly positioned horizontally in the virtual world.

According to the above structure, it is possible to prevent a contact determination result from being changed depending on a tilt of the moving object, and the like, thereby enabling the contact determination based on the gravitational direction defined in the virtual world.

Further, the contact determination region defining means may define a plurality of the first contact determination region for the moving object. In this case, the contact determination means may select one of the plurality of the first contact determination region in accordance with a condition of the moving object in the virtual world, and determine whether or not the selected one of the plurality of the first contact determination region contacts the contact object.

According to the above structure, the contact determination region appropriate for selecting a foot which is to contact the contact object can be selected from the plurality of the contact determination region in accordance with the condition of the moving object.

Further, the movement means may include moving direction control means. The moving direction control means controls a direction in which the moving object moves, in accordance with a user performing an operation. In this case, the contact determination means may select, from the plurality of the first contact determination region, the first contact determination region used for contact determination, based on the direction in which the moving object moves.

According to the above structure, a foot which is to contact the contact object can be selected in accordance with a direction (the handle direction or the like) in which the moving object moves.

Further, the contact object may have an attribute indicating whether or not a foot of the rider object is allowed to contact the contact object. In this case, the contact determination means may determine whether or not the first contact determination region contacts the contact object having the attribute indicating that the foot of the rider object is allowed to contact the contact object. The contact action control means may select, when the contact determination means determines that the first contact determination region contacts the contact object having the attribute indicating that the foot of the rider object is allowed to contact the contact object, a foot which is to contact the contact object, and may perform control such that the selected foot contacts the contact object.

According to the above structure, it is possible to avoid an unnatural state in which the rider object stops with its foot on the contact object on which the foot cannot contact.

Further, the contact determination means may determine whether or not a second contact determination region contacts a visible or an invisible obstacle object, each of which is provided so as to stand in the virtual world. In this case, the contact action control means may select, when the contact determination means determines that the second contact determination region does not contact the obstacle object, a foot which is to contact the contact object, and perform control such that the selected foot contacts the contact object.

According to the above structure, the contact action of the rider object can be controlled in accordance with the condition of the obstacle object near and lateral to the vehicle object.

Further, the contact determination region defining means may define the second contact determination region on each of a right side and a left side of the moving object, and the number of the second contact determination region defined on each of the right side and the left side of the moving object is at least one. In this case, the contact action control means may perform control, when the contact determination means determines that the second contact determination region defined on the left side of the moving object contacts the obstacle object, such that a right foot of the rider object contacts the contact object. On the other hand, the contact action control means may perform control, when the contact determination means determines that the second contact determination region defined on the right side of the moving object contacts the obstacle object, such that a left foot of the rider object contacts the contact object.

According to the above structure, the contact action of the rider object can be controlled in accordance with the condition of the obstacle object near the right side and the left side of the vehicle object.

Further, the information processing program may cause the computer to further function as movement speed calculation means and threshold value determination mean. The movement speed calculation means calculates a movement speed at which the moving object moves in the virtual world. The threshold value determination means determines whether or not the movement speed is higher than or equal to a first threshold value. In this case, the contact action control means selects, when the movement speed is lower than the first threshold value, a foot, of the rider object, which is to contact the contact object positioned in the virtual world, in accordance with a determination result of the contact determination means.

According to the above structure, when the movement speed of the moving object is smaller than the first threshold value, that is, the moving object move at a low speed, an unnatural representation of the rider object can be alleviated.

Further, the threshold value determination means may further determine whether or not the movement speed is lower than a second threshold value which is lower than the first threshold value. In this case, the contact action control means may select, when the second threshold value≤the movement speed<the first threshold value is satisfied, a foot, of the rider object, which is to contact the contact object positioned in the virtual world, in accordance with a determination result of the contact determination means, and cause the rider object to perform a preparation operation in which the selected foot contacts the contact object. Moreover, the contact action control means may select, when the movement speed is lower than the second threshold value, a foot, of the rider object, which is to contact the contact object positioned in the virtual world, in accordance with a determination result of the contact determination means, and perform control such that the selected foot contacts the contact object.

According to the above structure, when the second threshold value≤the movement speed of the moving object<the first threshold value is satisfied, the rider object is caused to perform an action in which the foot is prepared to contact the contact object, and when the movement speed of the moving object is lower than the second threshold value, the foot of the rider object contacts the contact object, thereby enabling two-stage action control.

Further, a second aspect of the present invention may be realized as an information processing apparatus.

According to the present invention, an unnatural representation of a rider object riding a vehicle object which moves in the virtual world can be alleviated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram illustrating a structure of the controller 7 shown in FIG. 3;

DESCRIPTION OF THE PREFERRED EMBODIMENTS

Figure 1:
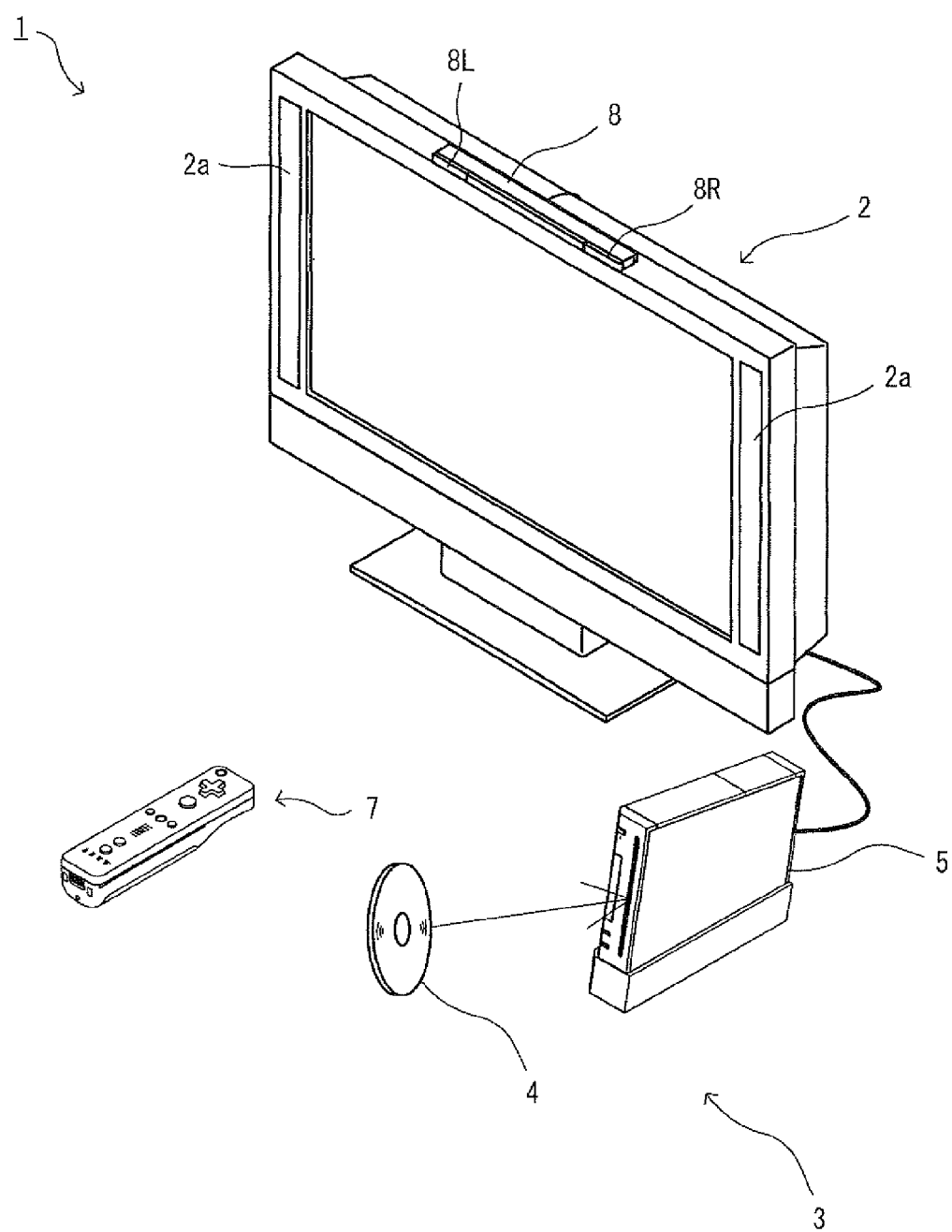
FIG. 1 is an external view illustrating a game system 1 according to an embodiment of the present invention.
Figure 2:
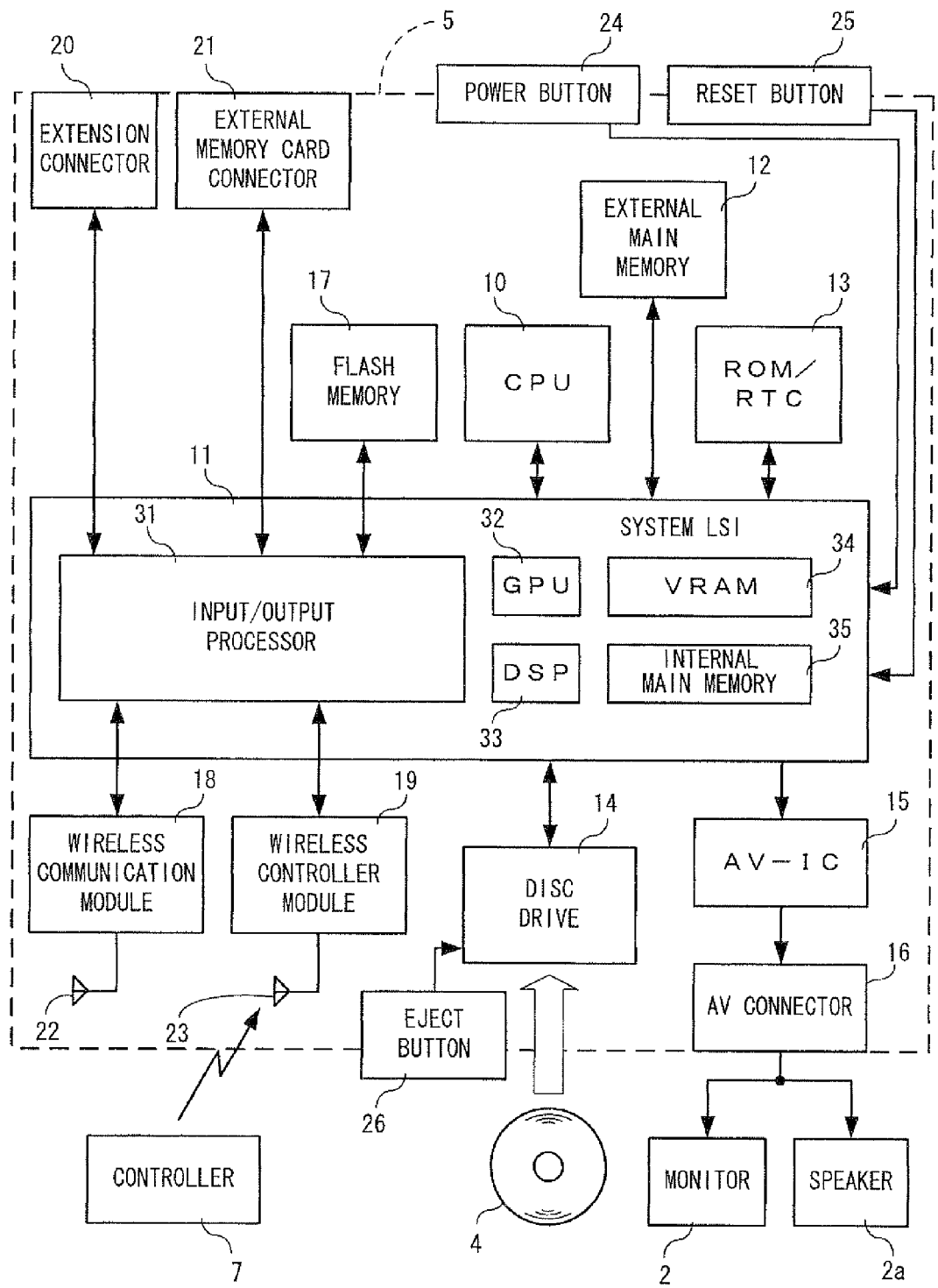
FIG. 2 is a functional block diagram of a game apparatus body 5 shown in FIG. 1.

With reference to FIG. 1, an information processing apparatus for executing an information processing program according to an embodiment of the present invention will be described. Hereinafter, in order to provide a specific description, a game system including a game apparatus body 5 which is a stationary game apparatus body corresponding to an example of the information processing apparatus will be described. FIG. 1 is an external view illustrating an example of the game system 1 including a stationary game apparatus 3. FIG. 2 is a block diagram illustrating an example of the game apparatus body 5. Hereinafter, the game system 1 will be described.

As shown in FIG. 1, the game system 1 includes: a household television receiver (hereinafter, referred to as a monitor) 2 which is an example of display means; and a game apparatus 3 which is a stationary game apparatus and is connected to the monitor 2 via a connection cord. The monitor 2 includes a speaker 2a for outputting as a sound an audio signal from the game apparatus 3. Further, the game apparatus 3 includes: an optical disc 4 in which stored is a program (for example, an exercise assistance program for assisting a user of the game apparatus 3 with exercise and a game program) corresponding to an example of the information processing program according to the present invention; the game apparatus body 5 having a computer for executing the programs stored in the optical disc 4 to output to and display on the monitor 2 a game screen; and a controller 7 for providing the game apparatus body 5 with operation information necessary for operating, for example, objects displayed on the display screen.

The game apparatus body 5 has a wireless controller module 19 (see FIG. 2) incorporated therein. The wireless controller module 19 receives data which is wirelessly transmitted from the controller 7, and allows the game apparatus body 5 to transmit the data to the controller 7, thereby connecting between the controller 7 and the game apparatus body 5 through wireless communication. Further, into the game apparatus body 5, the optical disc 4, which typifies an information storage medium and is exchangeable with respect to the game apparatus body 5, is detachably mounted.

The game apparatus body 5 has mounted thereto a flash memory 17 (see FIG. 2) which functions as a backup memory which fixedly stores data such as saved data. The game apparatus body 5 executes the exercise assistance program or the like which is stored in the optical disc 4, to display the obtained result as a game image on the monitor 2. The exercise assistance program or the like to be executed may be previously stored in the flash memory 17 as well as in the optical disc 4. Further, the game apparatus body 5 may reproduce a game state having been previously obtained, by using the saved data stored in the flash memory 17, and display a game image on the monitor 2. A user of the game apparatus 3 can operate the controller 7 while viewing the game image displayed on the monitor 2, thereby enjoying the game.

The controller 7 wirelessly transmits transmission data such as operation information, by using, for example, the Bluetooth (registered trademark) technology, to the game apparatus body 5 having the wireless controller module 19 incorporated therein. The controller 7 is operation means for mainly operating a player object and the like displayed on the display screen of the monitor 2. The controller 7 is provided with a housing which is small enough to be held by one hand, and a plurality of operation buttons (including a cross key and a stick) which are exposed at the surface of the housing. Further, as is apparent from the below description, the controller 7 has an imaging information calculation section 74 for taking an image as viewed from the controller 7. Exemplary objects whose images are to be taken by the imaging information calculation section 74, two LED modules (hereinafter, referred to as markers) 8L and 8R are provided in the vicinity of the display screen of the monitor 2. The markers 8L and 8R each output, for example, an infrared light forward from the monitor 2. Further, the controller 7 receives, by means of a communication section 75, the transmission data which is wirelessly transmitted form the wireless controller module 19 of the game apparatus body 5, and can generate a sound and a vibration in accordance with the transmission data.

Next, with reference to FIG. 2, an internal structure of the game apparatus body 5 will be described. FIG. 2 is a block diagram illustrating an exemplary structure of the game apparatus body 5. The game apparatus body 5 includes: a CPU (central processing unit) 10; a system LSI (large scale integration) 11; an external main memory 12; a ROM/RTC (read only memory/real time clock) 13; a disc drive 14; an AV-IC (audio video-integrated circuit) 15, and the like.

The CPU 10, serving as a game processor, executes the program stored in the optical disc 4 to perform a processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI 11 will be (described below. The external main memory 12, which is of a volatile type, stores programs loaded from the optical disc 4 or the flash memory 17, and various data, and is used as a work area and a buffer area for the CPU 10. The ROM/RTC 13 includes a ROM (so-called a boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

Provided in the system LSI 11 are an input/output processor 31, a GPU (graphics processor unit) 32, a DSP (digital signal processor) 33, a VRAM (video RAM) 34, and the internal main memory 35. These component 31 to 35 are connected to each other via an internal bus not shown.

The CPU 32, which is a part of rendering means, generates an image in accordance with a graphics command (draw command) supplied from the CPU 10. The VRAM 34 stores data (such as polygon data and texture data) necessary for the CPU 32 to execute the graphics command. When an image is generated, the CPU 32 generates image data by using the data stored in the VRAM 34.

The DSP 33 functions as an audio processor, and generates audio data by using sound data and sound waveform (tone quality) data stored in the internal main memory 35 and the external main memory 12.

The image data and the audio data generated as described above, are read by the AV-IC 15. The AV-IC 15 outputs the read image data to the monitor 2 via an AV connector 16, and also outputs the read audio data to the speaker 2a of the monitor 2. Thus, an image is displayed on the monitor 2, and a sound is outputted from the speaker 2a.

The input/output processor (I/O processor) 31 executes data reception and transmission among the components connected thereto and download of data from an external apparatus. The I/O processor 31 is connected to the flash memory 17, a wireless communication module 18, the wireless controller module 19, an extension connector 20, and an external memory card connector 21. To the wireless communication module 18, an antenna 22 is connected, and to the wireless controller module 19, an antenna 23 is connected.

The I/O processor 31 is connected to a network via the wireless communication module 18 and the antenna 22 and can communicate with other game apparatuses or various servers connected to the network. The I/O processor 31 accesses the flash memory 17 at regular time intervals to detect for data to be transmitted to the network. When the data to be transmitted is detected, the data is transmitted to the network via the wireless communication module 18 and the antenna 22. Further, the I/O processor 31 receives, via the network, the antenna 22 and the wireless communication module 18, data transmitted from the other game apparatuses or data downloaded from a download server, and stores the received data in the flash memory 17. The CPU 10 executes the program to read the data stored in the flash memory 17, thereby using the read data on the program. The flash memory 17 may store not only the data transmitted and received among the game apparatus body 5, and other game apparatuses or the various servers, but also saved data (result data or intermediate step data of the process) of a game played with the game apparatus body 5.

Further, the I/O processor 31 receives the operation data and the like transmitted from the controller 7 via the antenna 23 and the wireless controller module 19, and (temporarily) stores the operation data and the like in a buffer area of the internal main memory 35 or the external main memory 12. The internal main memory 35 may store programs loaded from the optical disc 4 or the flash memory 17, and various data, and may be used as a work area and a buffer area for the CPU 10, as with the external main memory 12.

The I/O processor 31 is connected to the extension connector 20 and the external memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The external memory card connector 21 is a connector for connecting to the external memory card connector 21 the external storage medium such as a memory card. For example, the I/O processor 31 accesses the external storage medium via the extension connector 20 or the external memory card connector 21, to store data in the external storage medium or read data from the external storage medium.

The game apparatus body 5 includes (on, for example, a front portion of its main surface): a power button 24 for the game apparatus body 5; a reset button 25 for a game process; an insertion opening through which the optical disc 4 is mounted or dismounted; an eject button 26 for ejecting the optical disc 4 through an insertion opening of the game apparatus body 5; and the like. The power button 24 and the reset button 25 are connected to the system LSI 11. When the power button 24 is pressed so as to be ON, the power is supplied to the respective components of the game apparatus body 5 via an AC adapter which is not shown. When the reset button 25 is pressed, the system LSI 11 restarts a boot program of the game apparatus body 5. The eject button 26 is connected to the disc drive 14. When the eject button 26 is pressed, the optical disc 4 is ejected from the disc drive 14.

Figure 3:
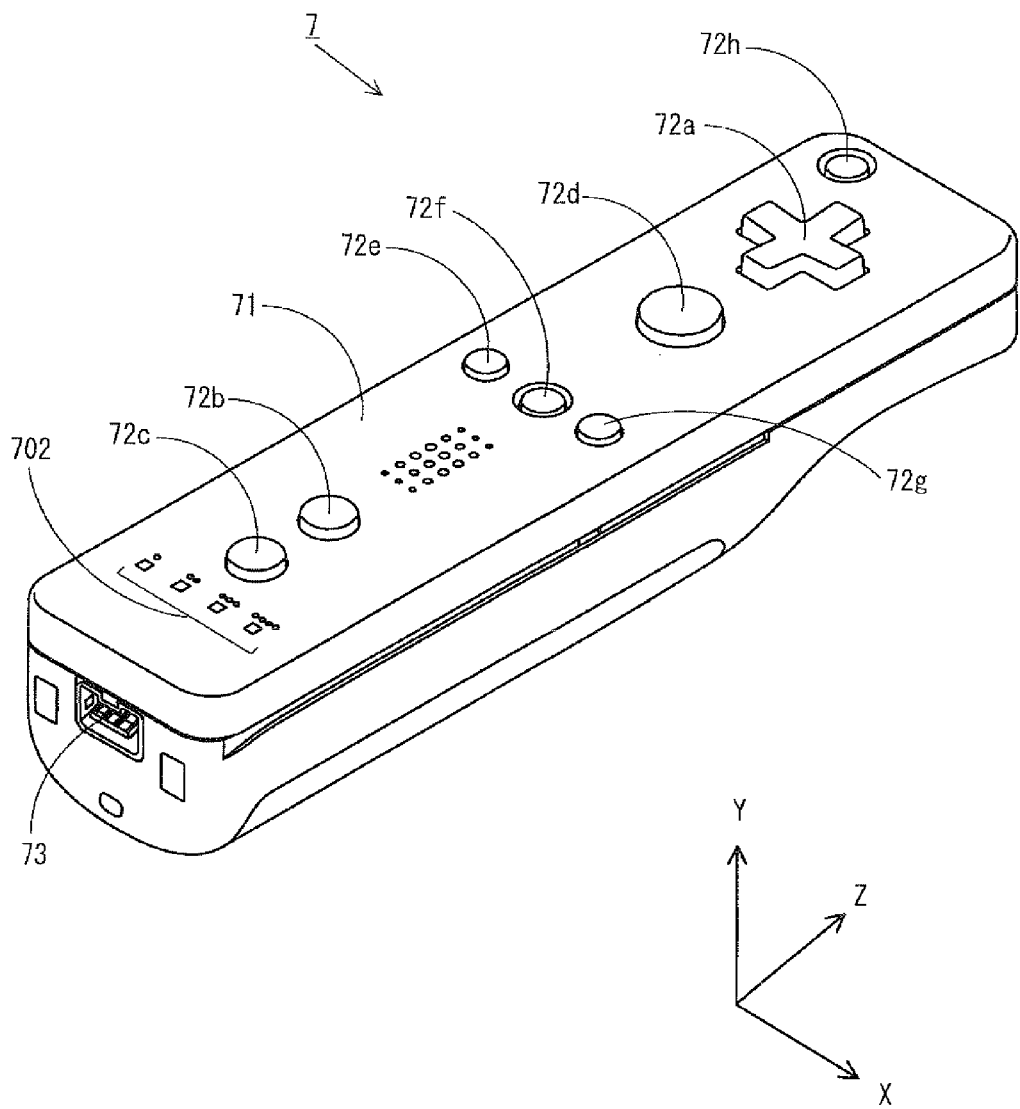
FIG. 3 is a perspective view of a controller 7 shown in FIG. 1 as viewed from the top rear side thereof.
Figure 4:
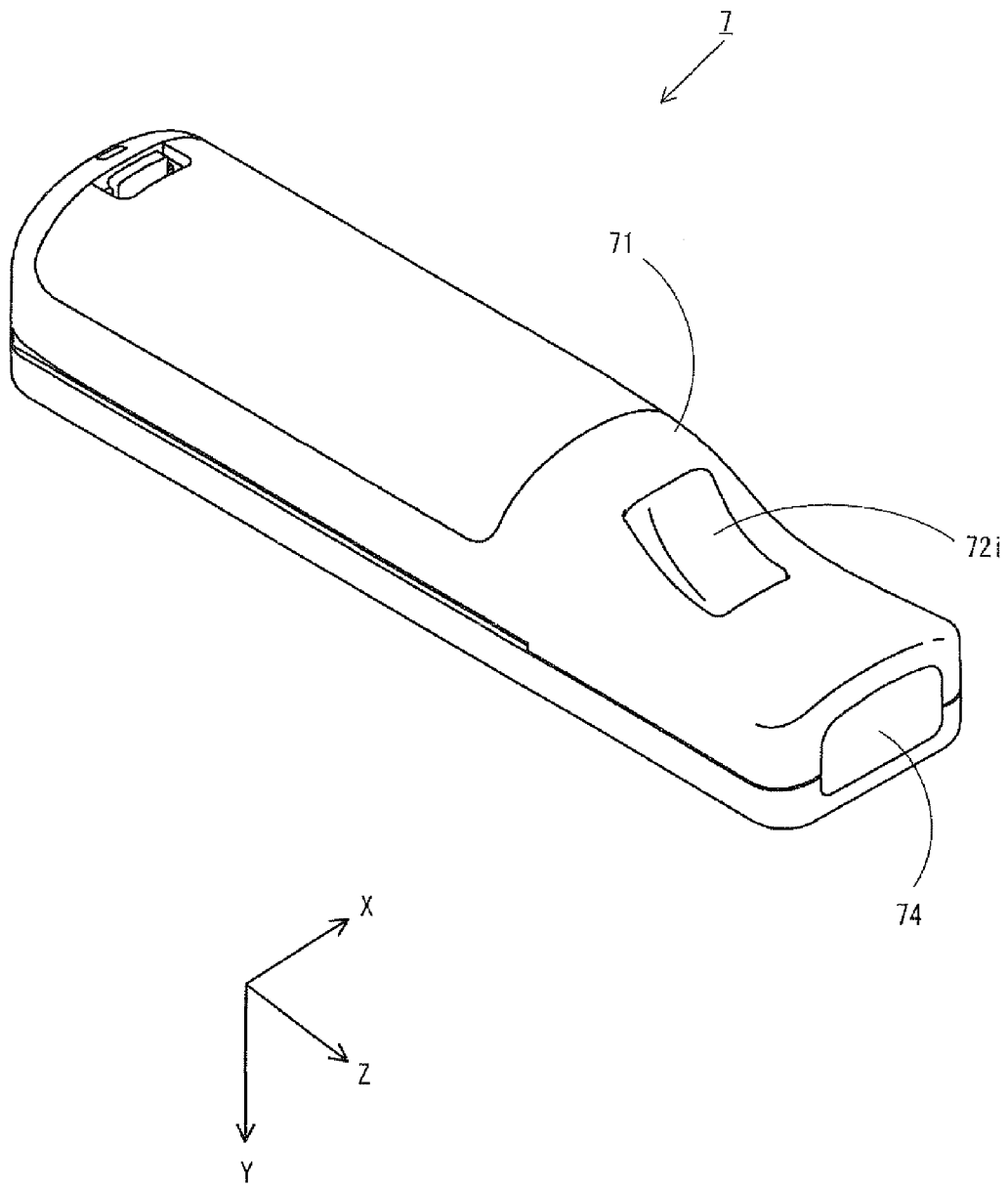
FIG. 4 is a perspective view of the controller 7 shown in FIG. 3 as viewed from the bottom front side thereof.

With reference to FIGS. 3 to 4, the controller 7 will be described. FIG. 3 is a perspective view of the controller 7 as viewed from the top rear side thereof. FIG. 4 is a perspective view of the controller 7 as viewed from the bottom front side thereof.

As shown in FIGS. 3 and 4, the controller 7 includes a housing 71 which is formed by, for example, plastic molding, and has a plurality of operation sections 72 in the housing 71. The housing 71 has a generally parallelepiped shape extending in a longitudinal direction from front to rear. The overall size of the housing 71 is small enough to be held by one hand of an adult or even a child.

At the center of the front portion of the top surface of the housing 71, a cross key 72a is provided. The cross key 72a is a cross-shaped four-direction push switch. The cross key 72a includes operation portions corresponding to the four directions (front, rear, right and left), which are located on cross-shaped projecting portions, respectively, arranged at intervals of 90 degrees. A user selects one of the front, rear, right and left directions by pressing a corresponding one of the operation portions of the cross key 72a. Through an operation on the cross key 72a, the user can, for example, indicate a direction in which an object or the like appearing in a virtual world is to move or select one of a plurality of options.

Although the cross key 72a is an operation section for outputting an operation signal in accordance with the aforementioned direction input operation performed by the user, such an operation section may be provided in another form. For example, the cross key 72a may be replaced with an operation section, including four push switches corresponding to directions, respectively, represented by a cross, for outputting an operation signal in accordance with the push switch having been pressed by the user. Alternatively, the cross key 72a may be replaced with an operation section including the aforementioned four push switches and a center switch provided at the center of the cross formed by the four push switches. Alternatively, the cross key 72a may be replaced with an operation section which includes an inclinable stick (so-called a joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are operation sections for outputting operation signals assigned to the operation buttons 72b, 72c, 72d, 72e, 72f and 72g, respectively, when the user presses a head thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with various operation functions in accordance with the program executed by the game apparatus body 5. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the user.

In front of the cross key 72a on the top surface of the housing 71, an operation button 72h is provided. The operation button 72h is a power switch for remote-controlling the power of the game apparatus body 5 to be on or off. The operation button 72h also has a top surface thereof buried in the top surface of the housing 71, so as not to be inadvertently pressed by the user.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the user of the controller type which is currently set to controller 7 that he or she is using. Specifically, a signal for lighting up one of the plurality of LEDs 702, which corresponds to the controller type, is transmitted from the wireless controller module 19 to the controller 7.

On the top surface of the housing 71, a sound hole for outputting a sound from a speaker (speaker 706 shown in FIG. 5) described below is formed between the operation button 72b and the operation buttons 72e, 72f, and 72g.

On the bottom surface of the housing 71, a recessed portion is formed. The recessed portion is formed at a position at which an index finger or middle finger of a user is located when the user holds the controller 7 with one hand so as to orient the front surface thereof to the markers 8L and 8R. On a slope surface of the recessed portion on the bottom surface of the housing 71, an operation button 72i is provided. The operation button 72i is an operation section acting as, for example, a B button.

On the front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The imaging information calculation section 74 will be described below in detail. On the rear surface of the housing 71, the connector 73 is provided. The connector 73 is, for example, an edge connector, and is used for engaging and connecting the controller 7 with, for example, the connection cable.

Here, for giving specific description, a coordinate system is defined for the controller 7. As shown in FIGS. 3 and 4, XYZ-axes orthogonal to each other are defined for the controller 7. Specifically, the Z-axis is defined along the longitudinal direction of the housing 71 corresponding to the front-rear direction of the controller 7, and the direction toward the front surface (the surface on which the imaging information calculation section 74 is provided) of the controller 7 is defined as the Z-axial positive direction. The Y-axis is defined along the top-bottom direction of the controller 7, and the direction toward the top surface (the surface on which the operation button 72a is provided) of the housing 71 is defined as the Y-axial positive direction. The X-axis is defined along the right-left direction of the controller 7, and the direction toward the right side surface (the side surface shown in FIG. 3) of the housing 71 is defined as the X-axial positive direction.

Figure 5:
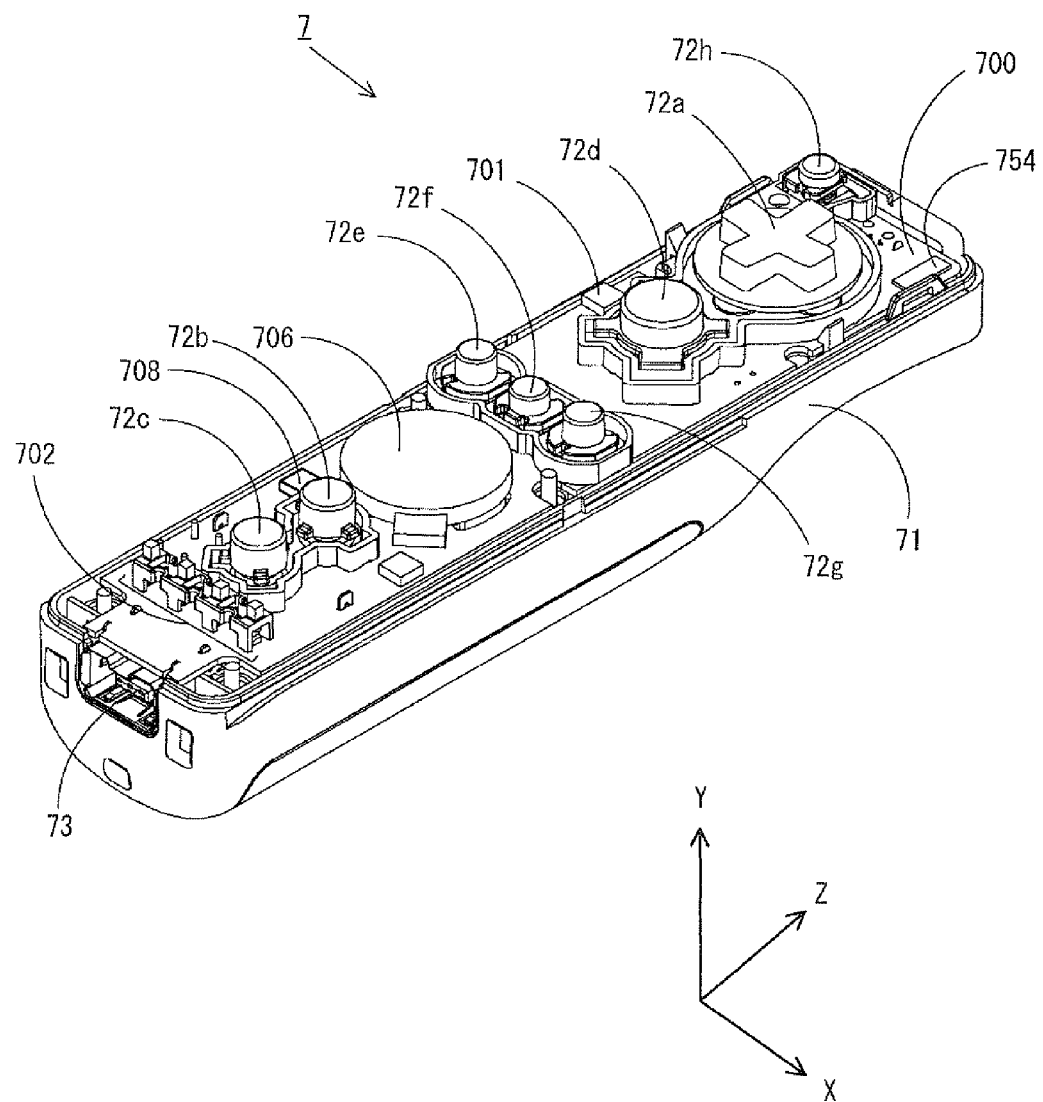
FIG. 5 is a perspective view illustrating a state where an upper housing of the controller 7 shown in FIG. 3 is removed.
Figure 6:
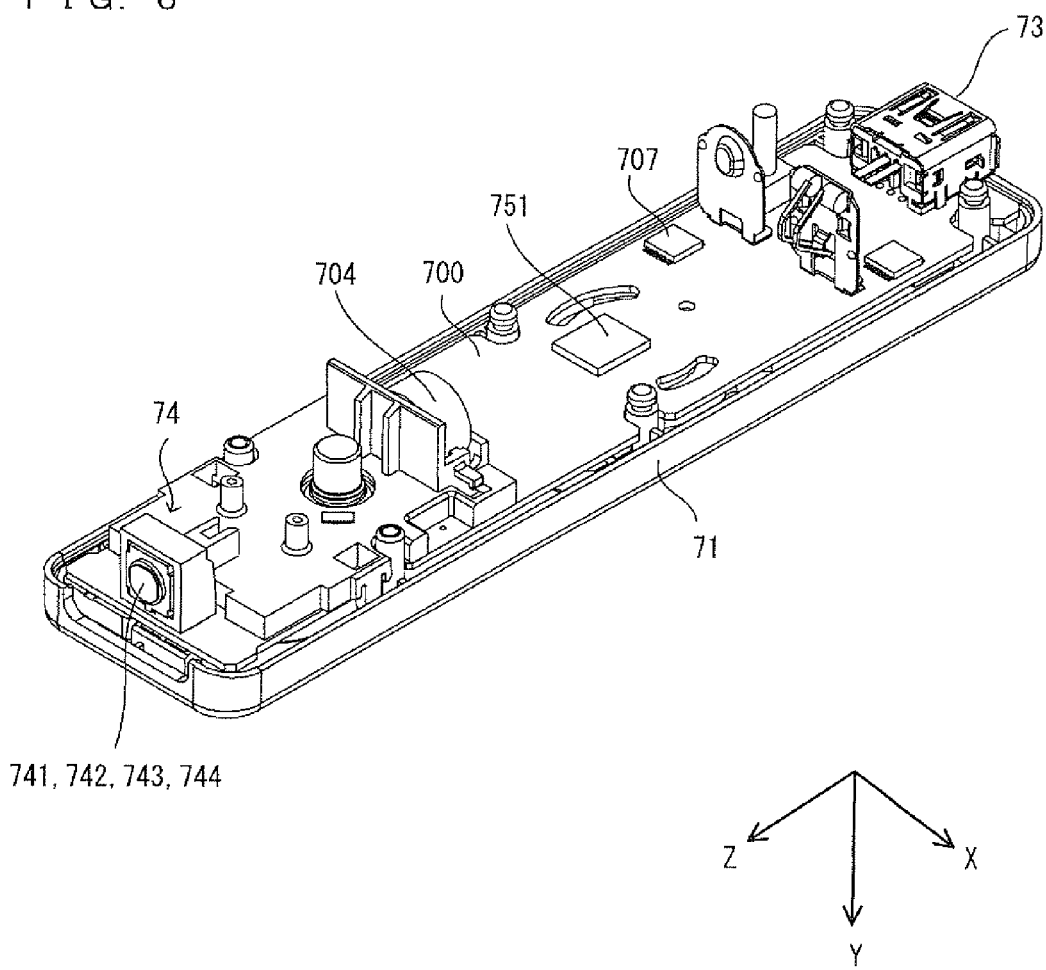
FIG. 6 is a perspective view illustrating a state where a lower housing of the controller 7 shown in FIG. 4 is removed.

With reference to FIGS. 5 and 6, an internal structure of the controller 7 will be described. FIG. 5 is a perspective view illustrating an exemplary state where an upper housing (a part of the housing 71) of the controller 7 is removed, as viewed from the rear surface side of the controller 7. FIG. 6 is a perspective view illustrating an exemplary state where a lower housing (a part of the housing 71) of the controller 7 is removed, as viewed from the front surface side of the controller 7. FIG. 6 shows a reverse side of a substrate 700 shown in FIG. 5.

As shown in FIG. 5, the substrate 700 is fixed inside the housing 71. On the top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A crystal oscillator (not shown), provided in the housing 71, generates a reference clock of the microcomputer 751 described below. On the top main surface of the substrate 700, the speaker 706 and an amplifier 708 are provided. The acceleration sensor 701 is provided to the left of the operation button 72d on the substrate 700 (that is, provided not at the center portion of the substrate 700 but near the periphery of the substrate 700). Accordingly, the acceleration sensor 701 is allowed to detect for both a direction change of the gravitational acceleration and an acceleration containing a component generated due to centrifugal force, in accordance with the controller 7 rotating about the longitudinal direction thereof. Therefore, by performing a predetermined calculation, the game apparatus body 5 or the like is allowed to determine the movement of the controller 7, with preferable accuracy, based on the acceleration data having been detected.

As shown in FIG. 6, at the front edge of the bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the controller 7 on the bottom main surface of the substrate 700. At the rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via a line formed on the substrate 700 and the like, and outputs an audio signal to the speaker 706 via the amplifier 708 in accordance with sound data transmitted from the game apparatus body 5.

With reference to FIG. 7, the internal structure of the controller 7 will be described. FIG. 7 is a block diagram illustrating an exemplary structure of the controller 7.

As shown in FIG. 7, the controller 7 includes a communication section 75 in addition to the operation sections 72, the imaging information calculation section 74, the acceleration sensor 701, the speaker 706, the sound IC 707, and the amplifier 708, which are described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pick-up device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs, to the communication section 75, process result data representing a position coordinate point and the area size of the identified spot. The imaging information calculation section 74 is fixed to the housing 71 of the controller 7. The imaging direction of the imaging information calculation section 74 can be changed by changing the direction of the housing 71.

The controller 7 preferably includes a three-axis (X-axis, Y-axis, and Z-axis) acceleration sensor 701. The three-axis acceleration sensor 701 detects a linear acceleration in three directions, i.e., the up/down direction (Y-axial direction shown in FIG. 3), the left/right direction (X-axial direction shown in FIG. 3), and the forward/backward direction (Z-axial direction shown in FIG. 3). Further, acceleration detection means which detects for a linear acceleration along at least two axial directions may be used. For example, theses acceleration sensors 701 may be of the type available from Analog Devices, Inc. or STMicroelectronics N.V. The acceleration sensor 701 may be preferably of an electrostatic capacitance (capacitance-coupling) type that is based on silicon micro-machined HEMS (Micro Electro Mechanical Systems) technology. However, an acceleration detection technology (e.g., piezoelectric type or piezoresistance type) now existing or any other suitable technology later developed may be used to provide the acceleration sensor 701.

The acceleration detection means, as used in the acceleration sensor 701, are capable of detecting for only an acceleration (linear acceleration) along a straight line corresponding to each axis of the acceleration sensor 701. In other words, the direct output of the acceleration sensor 701 is limited to signals indicative of linear acceleration (static or dynamic) along each of the three axes thereof. As a result, the acceleration sensor 701 cannot directly detect movement along a non-linear (e.g. arcuate) path, rotation, rotational movement, angular displacement, tilt, position, orientation or any other physical characteristic.

However, when a computer such as a processor (for example, the CPU 10) of a game apparatus or a processor (for example, the microcomputer 751) of the controller performs a process based on a signal of an acceleration outputted by the acceleration sensor 701, additional information relating to the controller 7 can be inferred or calculated (determined), as one skilled in the art will readily understand from the description herein.

For example, a case where the computer will perform a process assuming that a controller 7 including the acceleration sensor 701 is in a static state (that is, a case where it is anticipated that an acceleration detected by the acceleration sensor 701 will include only a gravitational acceleration) will be described. When the controller 7 is actually in the static state, it is possible to determine whether or not the controller 7 tilts relative to the gravity direction and to also determine a degree of the tilt, based on the acceleration having been detected. Specifically, in a case where the acceleration sensor 701 is capable of detecting for an acceleration in a single direction, when a state where 1 G (gravitational acceleration) is applied to a detection axis of the acceleration sensor 701 in the vertically downward direction represents a reference, it is possible to determine whether or not the controller 7 tilts relative to the vertically downward direction, based on only whether or not 1 G is applied in the direction of the detection axis of the acceleration sensor 701. Further, it is possible to determine a degree to which the controller 7 tilts relative to the vertically downward direction, based on a magnitude of the acceleration applied in the direction of the detection axis. Further, the acceleration sensor 701 capable of detecting an acceleration in multiaxial directions subjects, to a processing, the acceleration signals having been detected in the respective axes to more specifically determine the degree to which the controller 7 tilts relative to the gravity direction. In this case, although the processor may calculate, based on the output from the acceleration sensor 701, data representing an angle at which the controller 7 tilts, an approximate degree to which the controller 7 tilts may be inferred based on the output from the acceleration sensor 701 without calculating the data representing the angle of the tilt. Thus, when the acceleration sensor 701 is used in combination with the processor, the tilt, orientation, or position of the controller 7 can be determined.

On the other hand, in a case where it is anticipated that the acceleration sensor 701 will be in a dynamic state, the acceleration sensor 701 detects an acceleration based on a movement of the acceleration sensor 701, in addition to the gravitational acceleration component. Therefore, when the gravitational acceleration component is eliminated through a predetermined process, it is possible to determine, for example, a direction in which the controller 7 moves. Specifically, when the controller 7 including the acceleration sensor 701 is dynamically accelerated and moved with a hand of a user, it is possible to calculate various movements and/or positions of the controller 7 by processing the acceleration signals generated by the acceleration sensor 701. Even when it is anticipated that the acceleration sensor 701 will be in the dynamic state, the acceleration based on the movement of the acceleration sensor 701 is eliminated through predetermined process, whereby it is possible to determine the tilt of the controller 7 relative to the gravity direction.

In another embodiment, the acceleration sensor 701 may include an embedded signal processor or another type of dedicated processor for performing any desired processing of the acceleration signals outputted by embedded acceleration detection means prior to outputting signals to the microcomputer 751. For example, when the acceleration sensor 701 is intended to detect static acceleration (for example, gravitational acceleration), the embedded or dedicated processor could convert the detected acceleration signal to a corresponding tilt angle (or another preferable parameter). Data representing the acceleration detected by the acceleration sensor 701 is outputted to the communication section 705.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls an operation of the sound IC 707 based on the data received from the game apparatus body 5 by the wireless module 753 via the antenna 754. The sound IC 707 processes the sound data and the like transmitted from the game apparatus body 5 via the communication section 75.

Data from the controller 7 including an operation signal (key data) from the operation sections 72, three-axial direction acceleration signals (X, Y, and Z-axial direction acceleration data) from the acceleration sensor 701, and the process result data from the imaging information calculation section 74 are outputted to the microcomputer 751. The microcomputer 751 temporarily stores the respective input data (the key data, the X, Y, and Z-axial direction acceleration data, and process result data) in the memory 752 as the transmission data which is to be transmitted to the wireless controller module 19. The wireless transmission from the communication section 75 to the wireless controller module 19 is performed periodically at predetermined time intervals. Since game processing is generally performed at a cycle of 1/60 sec., data needs to be transmitted at a cycle of a time period shorter than the cycle of the game processing. Specifically, the game process unit is 16.7 ms (1/60 sec.), and the transmission interval of the communication section 75 structured using the Bluetooth (registered trademark) technology is 5 ms. At a time at which the transmission to the wireless controller module 19 is to be performed, the microcomputer 751 outputs the transmission data stored in the memory 752 as a series of operation information to the wireless module 753. The wireless module 753 uses, for example, the Bluetooth (registered trademark) technology to transmit, from the antenna 754, operation information as a radio wave signal by using a carrier wave of a predetermined frequency. Thus, data from the controller 7 including the key data from the operation sections 72, the X, Y, and Z-axial direction acceleration data from the acceleration sensor 701, and the process result data from the imaging information calculation section 74 are transmitted from the controller 7. The wireless controller module 19 of the game apparatus body 5 receives the radio wave signal, and the game apparatus body 5 demodulates or decodes the radio wave signal to obtain the series of operation information (the key data, the X, Y, and Z axial direction acceleration data, and the process result data). Based on the obtained operation information and the program, the CPU 10 of the game apparatus body 5 performs the processing. When the communication section 75 is structured by using the Bluetooth (registered trademark) technology, the communication section 75 can function to receive transmission data which is wirelessly transmitted from another device.

Figure 8:
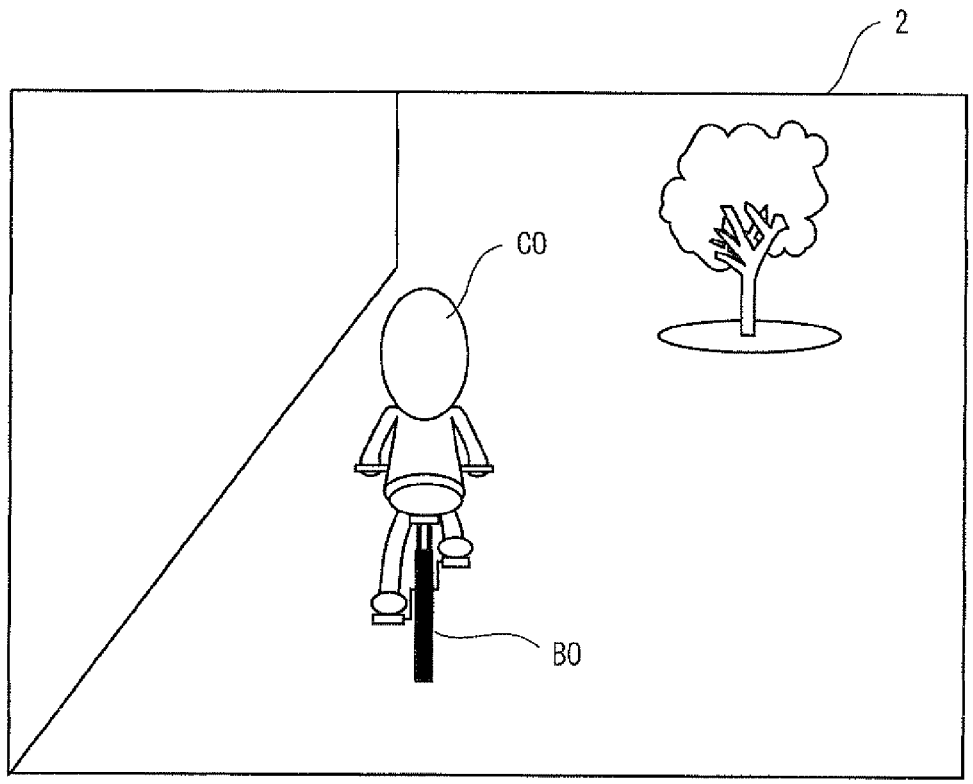
FIG. 8 schematically illustrates an exemplary image displayed on a monitor 2 when a user performs an operation by using the controller 7 shown in FIG. 1.
Figure 8:
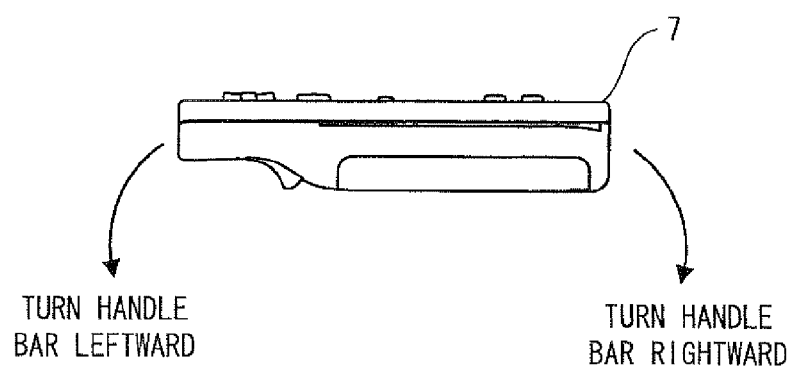
Figure 8:
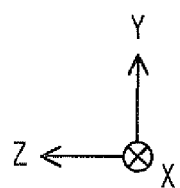
Figure 9A:
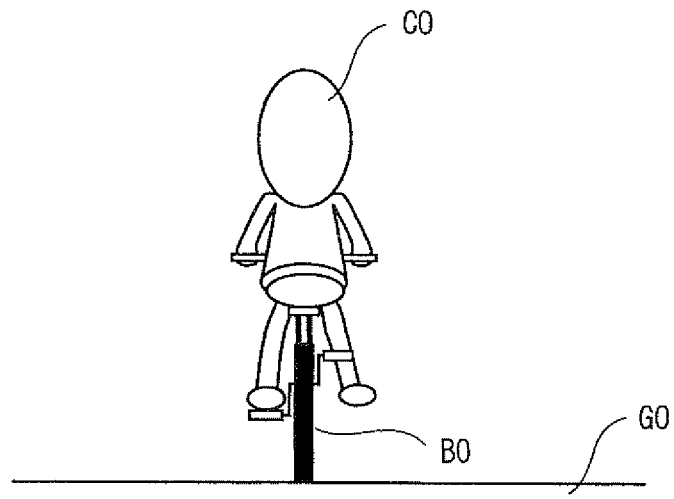
FIG. 9A is a diagram illustrating an exemplary image displayed when a right foot of a rider object CO is to contact a ground object GO.
Figure 9B:
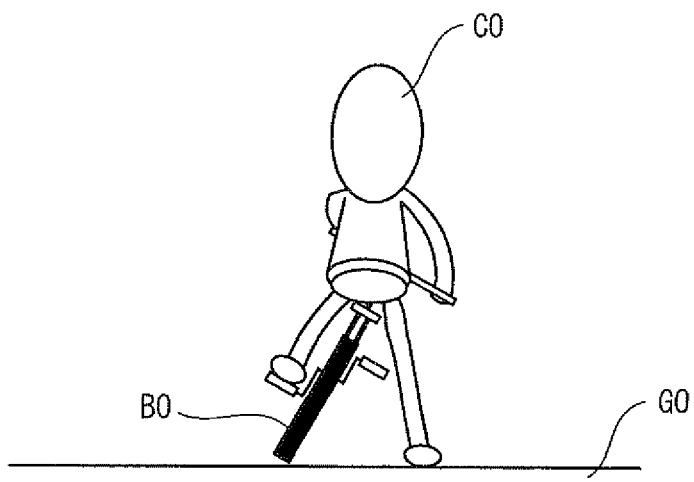
FIG. 9B is a diagram illustrating an exemplary image displayed when the right foot of the rider object CO is to contact the ground object GO.
Figure 10:
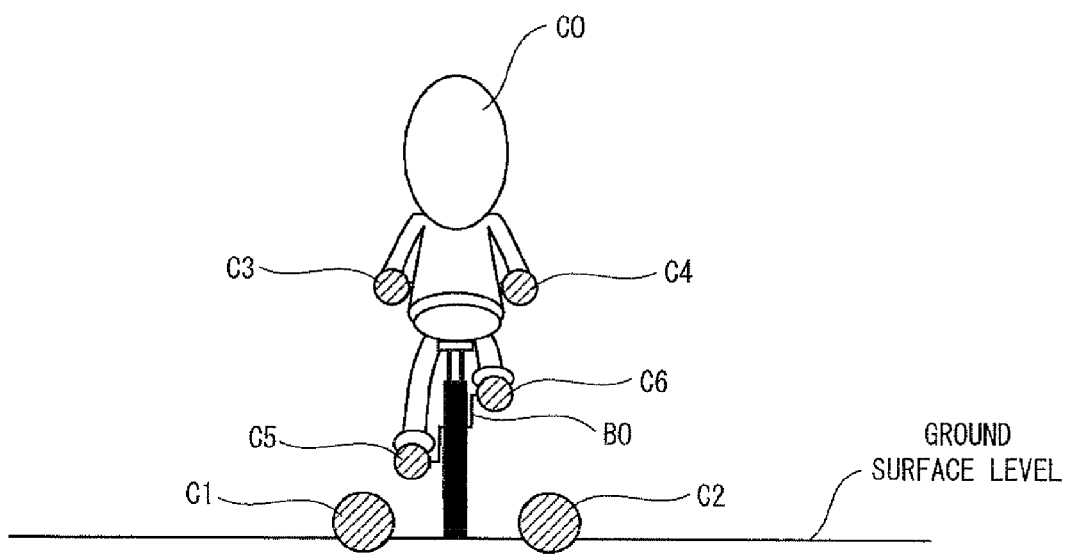
FIG. 10 is a diagram illustrating exemplary collisions C which are defined for a vehicle object BO and/or the rider object CO.
Figure 11A:
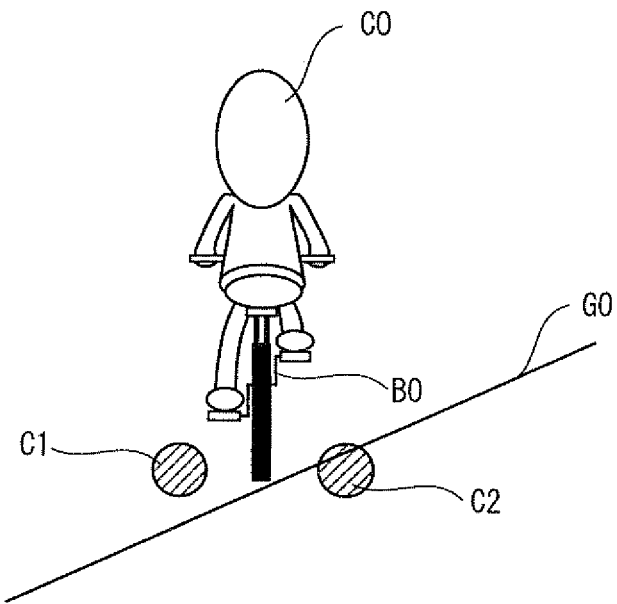
FIG. 11A is a diagram illustrating an exemplary image displayed when a foot of the rider object CO is to contact the ground object GO which is a slope.
Figure 11B:
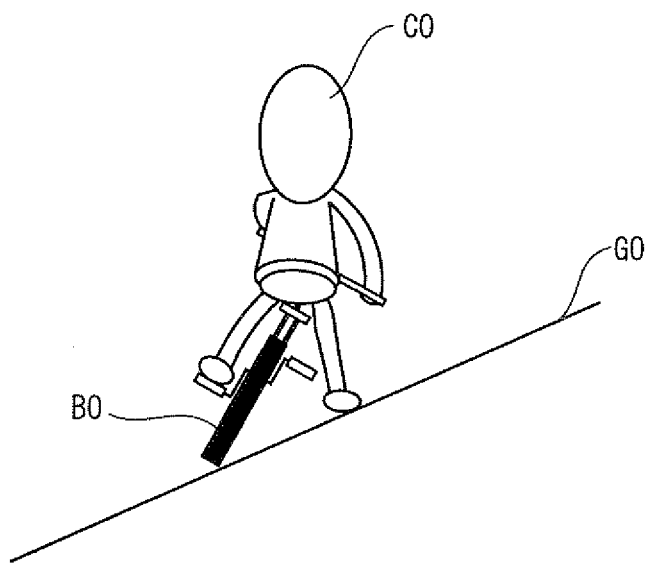
FIG. 11B is a diagram illustrating an exemplary image displayed when the foot of the rider object CO is to contact the ground object GO which is the slope.
Figure 12A:
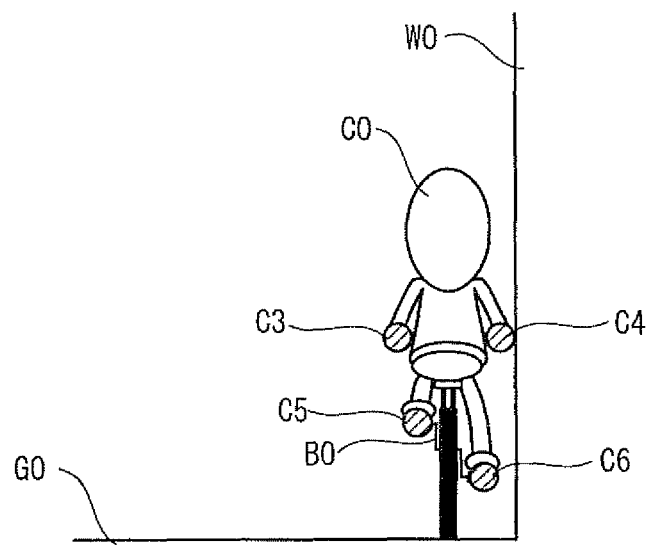
FIG. 12A is a diagram illustrating an exemplary image displayed when a foot of the rider object CO is to contact the ground object GO in a state where an obstacle object WO is near and lateral to the vehicle object BO and the rider object CO.
Figure 12B:
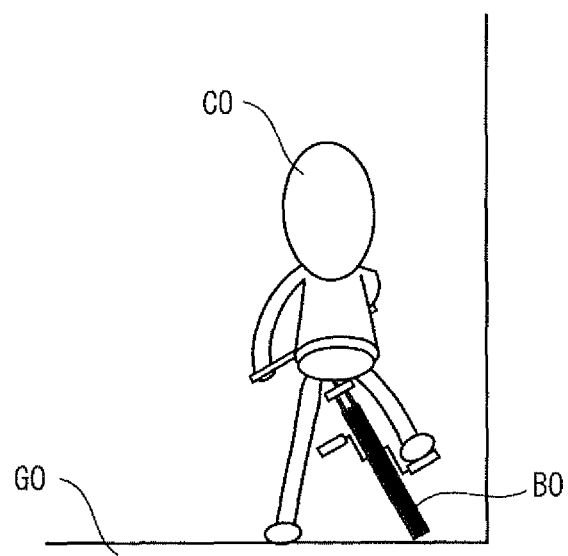
FIG. 12B is a diagram illustrating an exemplary image displayed when the foot of the rider object CO is to contact the ground object GO in a state where the obstacle object WO is near and lateral to the vehicle object BO and the rider object CO.

Next, an outline of a game performed by the game apparatus body 5 will be described with reference to FIG. 8 to FIG. 12B prior to description of a specific processing performed by the game apparatus body 5. FIG. 8 schematically illustrates an exemplary state of a user performing an operation by using the controller 7 and an exemplary image displayed on the monitor 2. FIG. 9A and FIG. 9B are diagrams illustrating exemplary images displayed when a right foot of a rider object CO contacts a ground object GO. FIG. 10 is a diagram illustrating exemplary collisions C which are defined for a vehicle object BO and/or the rider object CO. FIG. 11A and FIG. 11B are diagrams illustrating exemplary images displayed when a foot of the rider object CO contacts the ground object GO which is a slope. FIG. 12A and FIG. 12B are diagrams illustrating exemplary images displayed when a foot of the rider object CO contacts the ground object GO in a state where an obstacle object WO is near and lateral to the vehicle object BO and the rider object CO. An exemplary case where a user operates, by using the controller 7, the rider object CO that rides a bicycle (the vehicle object 20) and travels in the virtual world will be described below.

As shown in FIG. 8, in order to perform an operation using the controller 7 in the game system 1, a user holds the controller 7 so as to orient the top surface of the controller 7 upward in a real space. For example, a user holds the controller 7 as if the user holds a handle bar of a bicycle with both hands. The user is allowed to turn leftward the handle bar of the bicycle (the vehicle object BO) ridden by the rider object CO, by tilting the whole of the controller 7 left-downward (such that, for example, the front portion of the controller 7 having its top surface oriented upward in the real space is lowered relative to the X axis). On the other hand, the user is allowed to turn rightward the handle bar of the bicycle, by tilting the whole of the controller 7 right-downward (such that, for example, the rear portion of the controller 7 having its top surface oriented upward in the real space is lowered relative to the X axis). For example, when the user tilts the controller 7, operation information (specifically, X, Y, and Z-axial direction acceleration data) based on the operation of tilting the controller 7 is provided to the game apparatus body 5. An image representing a state where the rider object CO in the virtual world turns the handle bar rightward or leftward to change the direction in which the rider object CO and the vehicle object 20 are traveling is displayed based on the X, Y, and Z-axial direction acceleration data received from the controller 7.

A speed at which the vehicle object BO and the rider object CO travel in the virtual world is determined in accordance with the operation button 72 on the controller 7 being operated. For example, a button to be pressed for accelerating the vehicle object BO (that is, for accelerating a speed at which the rider object CO rotates pedals of the bicycle), and a button to be pressed for decelerating the vehicle object BO (that is, a button to be used when the rider object CO brakes the bicycle), are allocated to some operation button 72, and the traveling speed is changed in accordance with the appropriate operation section 72 being pressed by the user. When the vehicle object BO is traveling at a speed higher than or equal to a first movement speed (higher than or equal to a movement speed V1 described below), the rider object CO rides the bicycle with both feet on the pedals as shown in FIG. 8.

When the vehicle object BO is traveling at a speed which is lower than the first movement speed (lower than the movement speed V1) and higher than a second movement speed (higher than a movement speed V2 described below) or at a speed which is equal to the second movement speed (equal to the movement speed V2 described below), any one of the feet of the rider object CO contacts the ground object GO for preparing to stop the vehicle object BO. Specifically, as shown in FIG. 9A, the rider object CO releases any one of its feet from the pedal of the bicycle such that the released foot contacts the ground object GO, thereby preparing to stop the vehicle object BO (contact preparation operation).

When the vehicle abject BO is traveling at a speed lower than the second movement speed (lower than the movement speed V2), any one of the feet of the rider object CO contacts the ground object GO to stop the vehicle object BO. Specifically, as shown in FIG. 9B, the rider object CO acts such that the foot having been released from the pedal in the immediately preceding contact preparation operation contacts the ground object GO, thereby stopping the vehicle object BO (contact operation). An object which is to contact the foot of the rider object CC is not necessarily the ground object GO on which the vehicle object BO is traveling, and may be any object which is positioned in the virtual world, and is not displayed as an unnatural animation when the foot of the rider object CO contacts she object. For example, the object which is to contact the foot of the rider object CO may be selected from various objects, positioned in the virtual world, including an object which is positioned such that a height from the ground to the top surface of the object is lower than a height from the ground to the bottom of the foot having been released from the pedal of the bicycle in the contact preparation operation.

A foot of the rider object CO which is to contact the ground when the stopping of the vehicle object BO is prepared, and when the rider object BO is stopped is determined based on, for example, a direction in which the handle bar of the vehicle object BO is turned, a condition of the ground object GO, and/or whether or not an obstacle is positioned near and lateral to the vehicle object BO. According to the present invention, a contact determination region (for example, a collision) is defined for the vehicle object BO and/or the rider object CO, and the condition of the ground object GO, and whether or not an obstacle is positioned near and lateral to the vehicle object BO are determined based on a contact determination result based on the contact determination region, thereby determining a foot of the rider object CO which is to contact the ground. For example, as shown in FIG. 10, in the present embodiment, a plurality of the collisions C are defined so as to determine the condition of the ground object GO and whether or not an obstacle is positioned near and lateral to the vehicle object BO. Each collision C is a region (space) used for determining whether or not the vehicle object BO an/or the rider object CO contact another object.

As shown in FIG. 10, a plurality of the collisions C1 to C6 are defined for the vehicle object BO. The collisions C1 to C6 are defined so as to determine whether or not the vehicle object BO and/or the rider object CO contact another object, and each collision has an invisible three-dimensional shape, such as a column or a sphere, of a predetermined size. Specifically, the collisions C1 and C2 are defined at positions at which the left foot and the right foot, respectively, of the rider object CO contact the ground when the vehicle object BO is stopped. In an example shown in FIG. 10, the collision C1 is defined under the left foot of the rider object CO, and the collision C2 is defined under the right foot of the rider object CO. The collisions C1 and C2 are positioned such that a part of each of the collisions C1 and C2 project downward from the ground surface level on which the vehicle object BO contacts the ground. For example, the collisions C1 and C2 each has its lower edge portion projecting downward from the ground surface level, and the center positions of the collisions C1 and C2 are positioned above the ground surface level. When the vehicle object BO and the rider object CO move, the collisions C1 and C2 move together with the vehicle object BO so as to constantly maintain the collisions C1 and C2 level with each other in the virtual world. Specifically, even when the vehicle object BO is tiled in the virtual world, the collisions C1 and C2 are constantly maintained level with each other.

The collisions C3 to C6 are defined for bath ends of the handle bar and outward end portions of pedals, respectively, in the vehicle object BO. The collisions C3 to C6 are defined for determining whether or not an obstacle (for example, a visible wall or an invisible wall for blocking entrance of the vehicle object BO) provided in the virtual world contacts the vehicle object BO and/or the rider object CO on a lateral side of the vehicle object BO and/or the rider object CO. In an example shown in FIG. 10, the collision C3 is defined for the left end portion of the handle bar of the vehicle object 30, and the collision C4 is defined for the right end portion of the handle bar of the vehicle object BO, the collision C5 is defined for the outward end portion of the left pedal of the vehicle object BO, and the collision C6 is defined for the outward end portion of the right pedal of the vehicle object BO. When the vehicle object BO and the rider object CO move, the collisions C3 to C6 move together with the vehicle object BO, and the positional relationship between the vehicle object BO and the collisions C3 to C6 are maintained unchanged. Specifically, when the vehicle object BO is tiled in the virtual world, the collisions C3 to C6 move together with the vehicle object BO in accordance with the vehicle object BO being tilted.

As shown in FIG. 11A and FIG. 11B, when the vehicle object BO is stopped, the foot of the rider object CO contacts the ground based on a contact determination result obtained from a contact between the ground object GO and the collisions C1 and C2. For example, when the ground object GO does not contact one of the collisions C1 or C2, the foot, of the rider object CO, corresponding to one of the collisions C1 or C2 which is determined as contacting the ground object GO is selected as a foot which is to contact the ground. For example, as shown in FIG. 11A, in a case where the vehicle object BO is to be stopped on the ground object GO inclining downward from right to left, when the collision C1 on the left side of the vehicle object BO does not contact the ground object GO, the right foot of the rider object CO contacts the ground object GO (FIG. 11B). That is, when the vehicle object BO is stopped on a slope surface, the foot of the rider object CO contacts the ground on the higher side of the slope. Thus, when the vehicle object BO is stopped on a slope surface, on an edge of a cliff, near water surface (sea, river, or the like), an unnatural representation in which the rider object CO tries to act such that its foot contacts the ground on the lower side of the slope or in a space outside the cliff, or puts its foot on the water surface can be avoided.

As shown in FIG. 12A and FIG. 12B, when the vehicle object BO is stopped, a foot of the rider object CO which is to contact the ground is selected in accordance with the contact determination result obtained from a contact between the obstacle object WO and the collisions C3 to C6. For example, when any of the collisions C3 to C6 contacts the obstacle object WO, a foot, of the rider object CO, which is determined as being positioned on the side on which none of the collisions C3 to C6 contacts the obstacle object WO is selected as a foot which is to contact the ground. For example, as shown in FIG. 12A, in a case where the vehicle object BO is stopped on the ground object GO on which the obstacle object WO is positioned near and lateral to the right side of the vehicle object BO, when the collision C4 and/or the collision C6 positioned on the right side of the vehicle object BO contacts the obstacle object WO, the left foot of the rider object CO contacts the ground object GO (FIG. 12B). That is, when the vehicle object BO is stopped in a place in which an obstacle is positioned near and lateral to the vehicle object BO, the foot of the rider object CO contacts the ground on the side near which no obstacle is positioned. Thus, an unnatural representation where the rider object CO acts such that its foot contacts an obstacle or puts its foot into the obstacle in the virtual world can be avoided.

As described above, the collisions C3 to C6 move together with the vehicle object BO in accordance with the vehicle object BO being tilted, while the collisions C1 and C2 are constantly maintained level with each other in the virtual world. This is because it is necessary to prevent the contact determination result based on the collisions C1 and C2 from changing depending on the tilting of vehicle object BO, and to enable determination based on the direction of gravitational force defined in the virtual world. Specifically, in a case where the collisions C1 and C2 are tilted together with the vehicle object BO, when the vehicle object BO in the state shown in FIG. 11A is tilted leftward, the collision C1 contacts the ground object GO, thereby enabling the foot of the rider object CO to contact the ground on the lower side of the slope. On the other hand, when the vehicle object BO in the state shown in FIG. 11A is tilted rightward, the collision C2 is fully buried under the ground object GO. In this case, in the determination of contact with the surface of the ground object GO (for example, when it is determined whether or not a collision contacts a topography polygon), it is determined that the collision C2, which is fully buried under the ground object GO, does not contact the ground object GO. Therefore, the foot of the rider object CO cannot contact the ground on the higher side of the slope. Thus, when the collisions C1 and C2 are tilted together with the vehicle object BO, the contact determination result based on the collisions C1 and C2 is changed depending on the tilting of the vehicle object BO, and therefore the determination result may be unstable.

Further, it is difficult to use a method in which either the higher side or the lower side of the slope is determined based on a direction in which the vehicle object BO stands upright, when the direction in which the vehicle object BO stands upright changes, and the determination based on the direction of gravitational force or the horizontal direction in the virtual world is necessary. Therefore, when either the higher side or the lower side for a slope which inclines in the left-right direction as viewed from the rider object CO is determined, it is desirable that the determination is made based on the direction of gravitational force or the horizontal direction in the virtual world. It is favorable that the collisions C1 and C2 are positioned so as to be constantly level with each other in the virtual world in order to determine either the higher side or the lower side for the slope.

Figure 13:
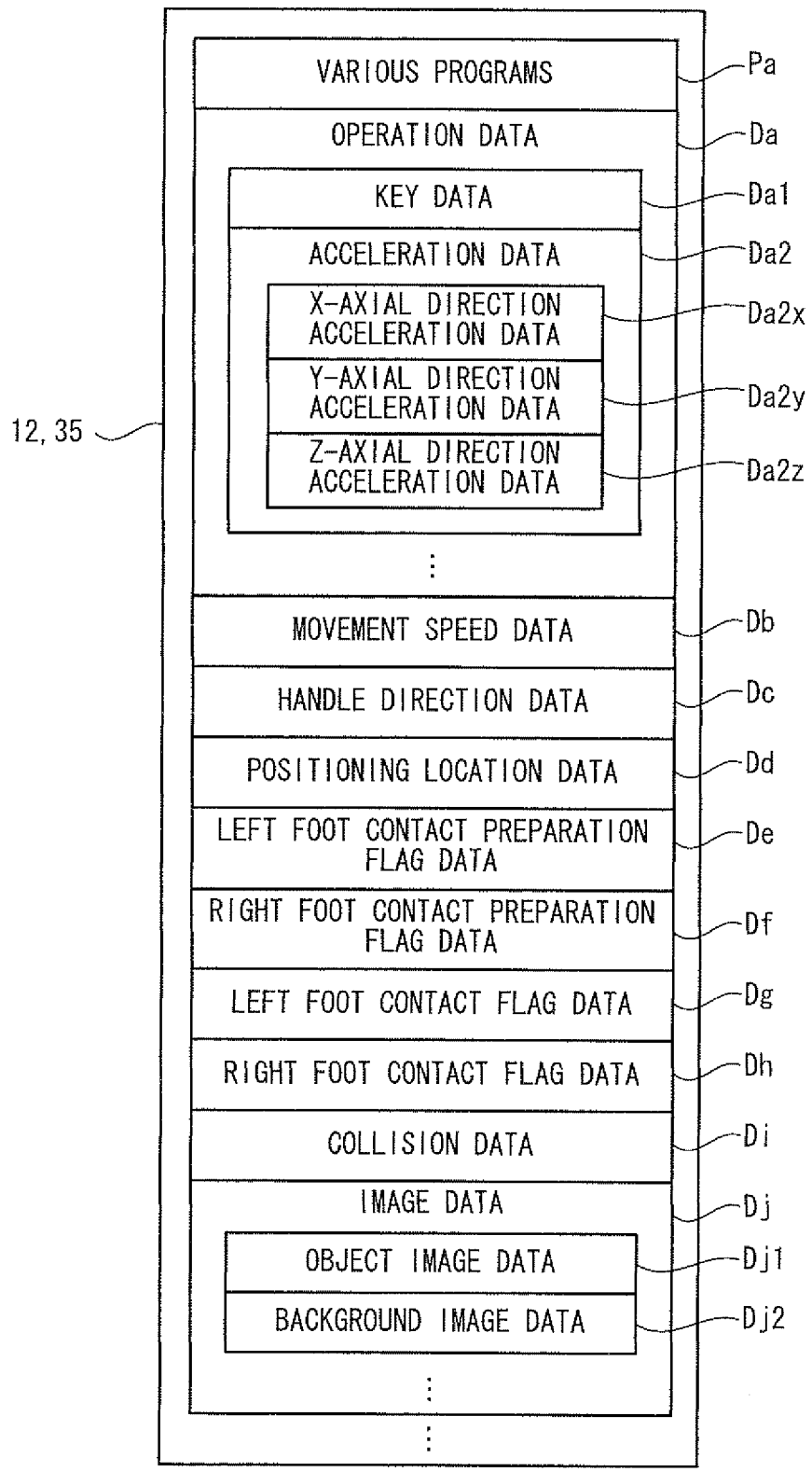
FIG. 13 is a diagram illustrating examples of main data and programs to be stored in a main memory of the game apparatus body 5 shown in FIG. 1.

Next, a processing performed by the game system 1 will be described in detail. Firstly, with reference to FIG. 13, main data to be used in the processing will be described. FIG. 13 is a diagram illustrating examples of main data and programs to be stored in the external main memory 12 and/or the internal main memory 35 (hereinafter, the two main memories are generically referred to simply as a main memory) of the game apparatus body 5.

As shown in FIG. 13, in a data storage region of the main memory, operation data Da, movement speed data Db, handle direction data Dc, positioning location data Dd, left foot contact preparation flag data De, right foot contact preparation flag data Df, left foot contact flag data Dg, right foot contact flag data Dh, collision data Di, the image data Dj, and the like are stored. In addition to the data included in information shown in FIG. 13, data necessary for the processing, including data (for example, position data) for objects (for example, the ground object GO and the obstacle object WO), other than the vehicle object BO and the rider object CO, appearing in the virtual world, are stored in the main memory. Further, various programs Pa included in information processing program are stored in a program storage region of the main memory.

The operation data Da contains a series of operation information transmitted as transmission data from the controller 7, and has its data updated to the most recent operation data. The operation data Da includes key data Da1, acceleration data Da2, and the like. The key data Da1 represents an operation performed on the operation sections 72 of the controller 7, and contains the most recent key data included in the series of operation information transmitted as the transmission data from the controller 7. The acceleration data Da2 represents an acceleration generated in the controller 7, and contains the most recent acceleration data included in the series of operation information transmitted as the transmission data from the controller 7. The acceleration data Da2 contains X-axial direction acceleration data Da2x representing an acceleration, for an X-axial component, detected by the acceleration sensor 701, Y-axial direction acceleration data Da2y representing an acceleration, for a Y-axial component, detected by the acceleration sensor 701, and Z-axial direction acceleration data Da2z representing an acceleration, for a Z-axial component, detected by the acceleration sensor 701. The wireless controller module 19 of the game apparatus body 5 receives the key data and the acceleration data included in the operation information transmitted from the controller 7 at predetermined time intervals (for example, every 1/200 seconds), and stores the key data and the acceleration data in a buffer, not shown, of the wireless controller module 19. Thereafter, the key data and the acceleration data stored in the buffer are read every one frame (for example, every 1/60 seconds) corresponding to a processing cycle, and the key data Da1 and the acceleration data Da2 in the main memory are updated.

At that time, since an operation information reception cycle is different from a processing cycle, the operation information received at plural time points are stored in the buffer. In each process step described below, only the operation information having been most recently received, among the operation information having been received at plural time points, is always used and processed, thereby advancing the process to the subsequent step.

In the process flow described below, the key data Da1 and the acceleration data Da2 are updated every one frame corresponding to the processing cycle. However, the key data Da1 and the acceleration data Da2 may be updated based on another processing cycle. For example, the key data Da1 and the acceleration data Da2 may be updated based on the cycle of the transmission from the controller 7, and the key data Da1 and the acceleration data Da2 having been updated may be used based on the processing cycle. In this case, the cycle for updating the key data Da1 and the acceleration data Da2 is different from the other processing cycle.

The movement speed data Db contains data representing a movement speed V at which the vehicle object BC and the rider object CO move in the virtual world. The handle direction data Dc contains data representing a direction in which the handle bar of the vehicle object BO is turned. The positioning location data Dd contains data representing locations of the vehicle object BO and the rider object CO in the virtual world.

The left foot contact preparation flag data De contains data representing a left foot contact preparation flag which is set to ON when the rider object CO can stop the vehicle object BO by its left foot contacting the ground in the contact preparation operation. The right foot contact preparation flag data Df contains data representing a right foot contact preparation flag which is set to ON when the rider object CO can stop the vehicle object BO by its right foot contacting the ground in the contact preparation operation. The left foot contact flag data Dg contains data representing a left foot contact flag which is set to ON when the left foot of the rider object CO contacts the ground to stop the vehicle object BO in the contact operation. The right foot contact flag data Dh contains data representing a right foot contact flag which is set to ON when the right foot of the rider object CO contacts the ground to stop the vehicle object BO in the contact operation.

The collision data Di contains data representing locations, sizes, shapes, and the like of the collisions C1 to C6 in the virtual world.

The image data Dj includes object image data Dj1, background image data Dj2, and the like. The object image data Dj1 is used for generating an image including, for example, the vehicle object BO, the rider object CO, the ground object GO, the obstacle object WO which are positioned in the virtual world. The background image data Dj2 is used for generating an image including a background positioned in the virtual world.

Figure 14:
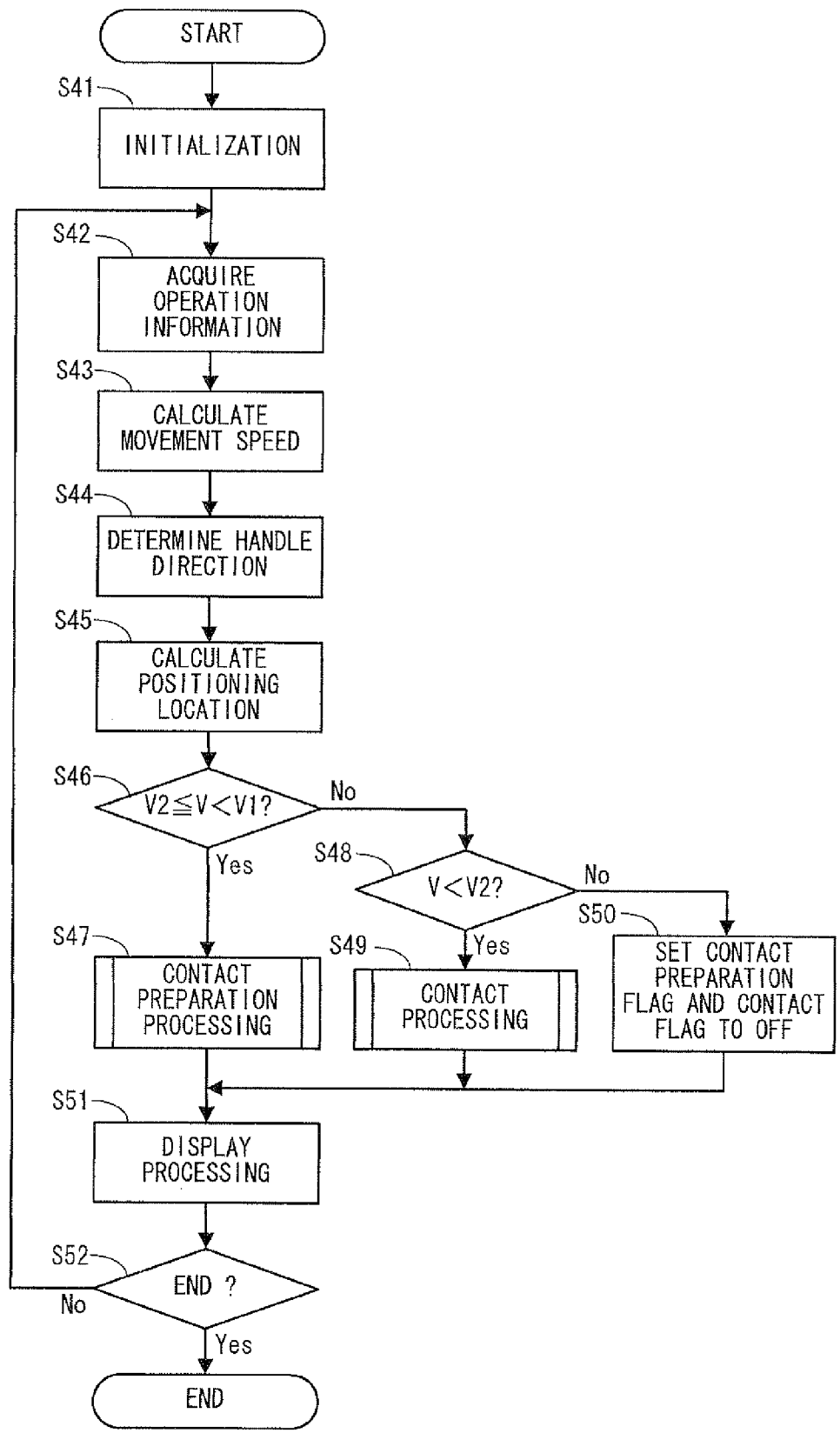
FIG. 14 is a flow chart showing an exemplary processing performed by the game apparatus body 5 shown in FIG. 1.
Figure 15:
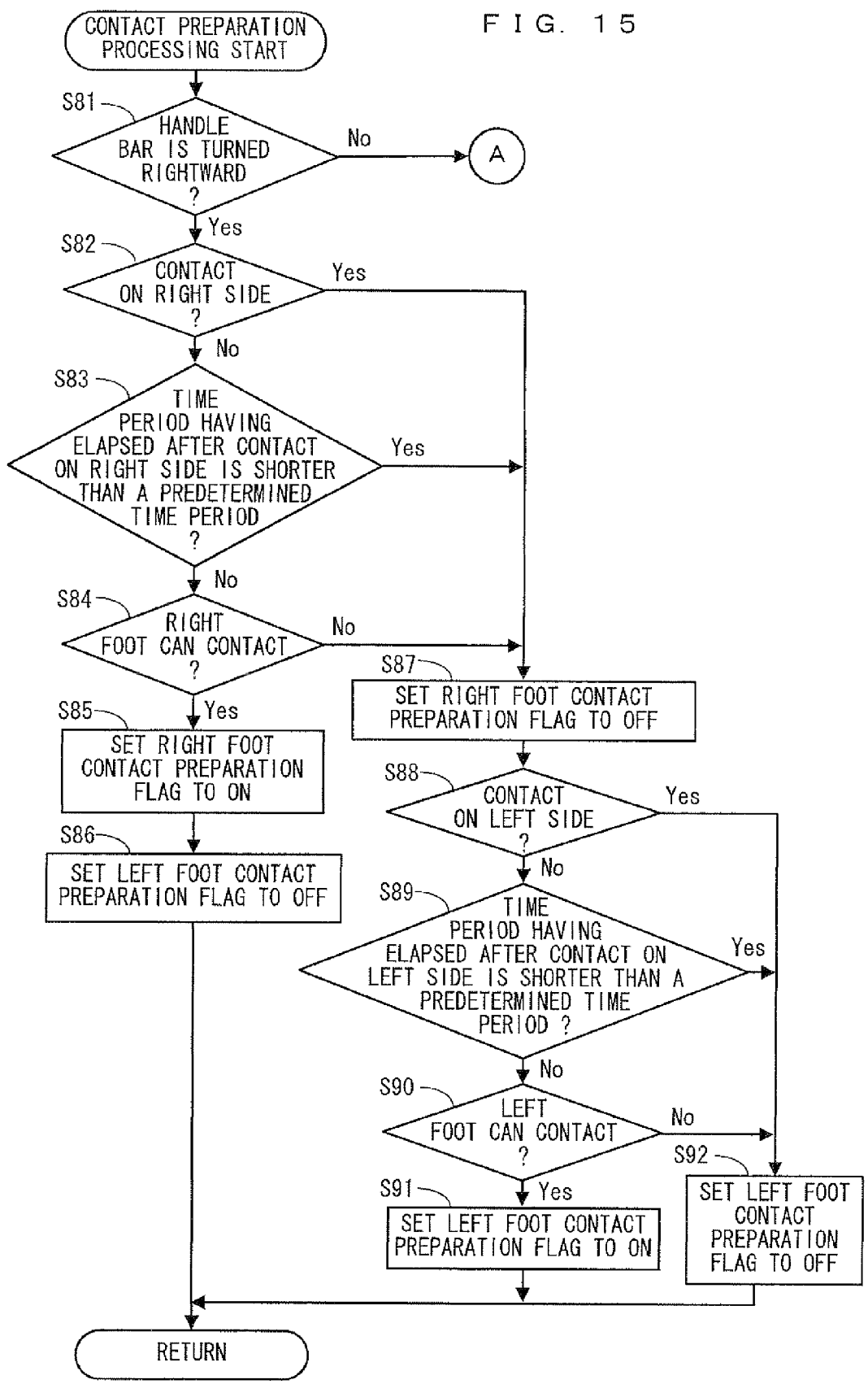
FIG. 15 shows a sub-routine showing a part of an exemplary contact preparation process of step 47 shown in FIG. 14.
Figure 16:
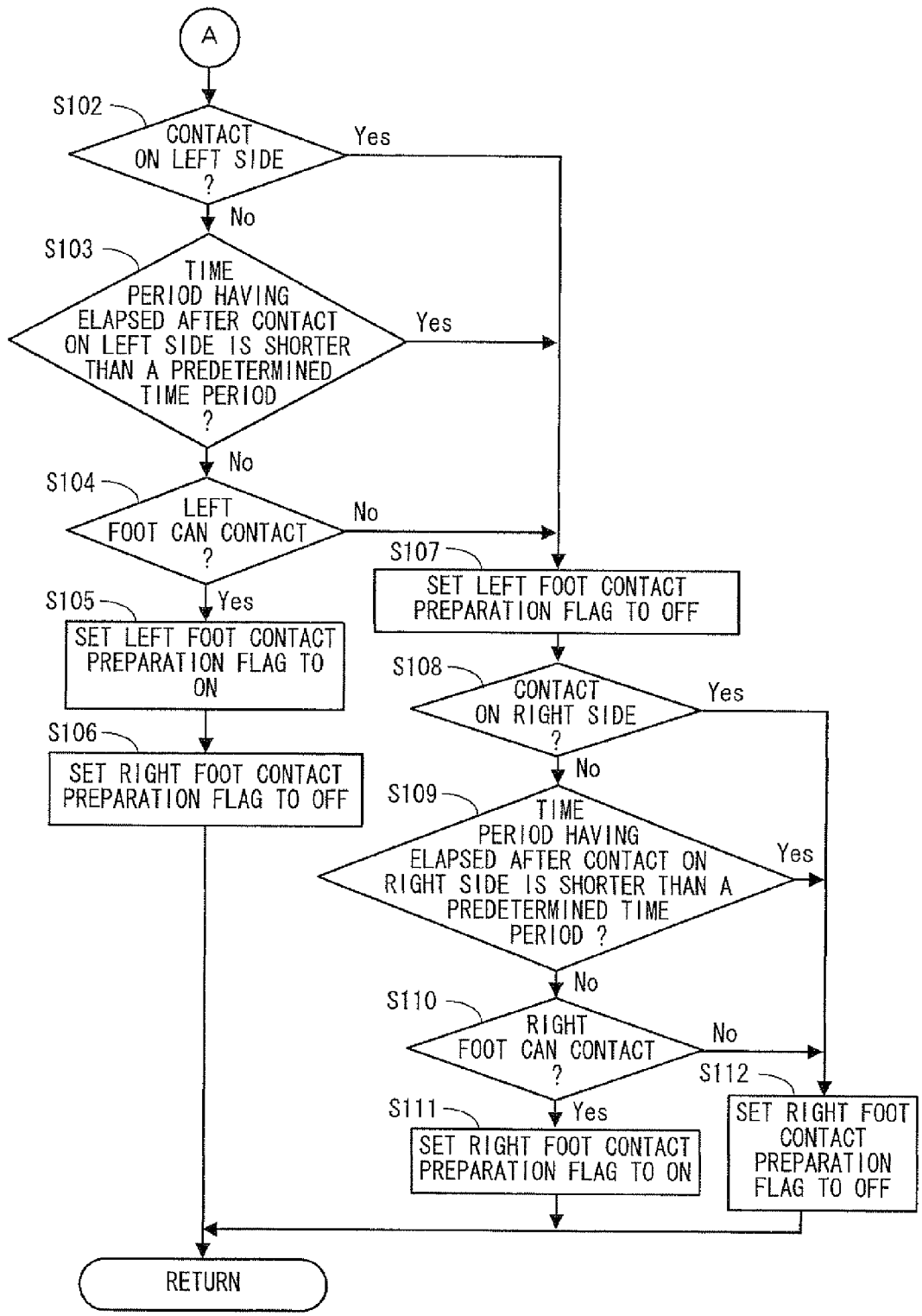
FIG. 16 shows a sub-routine showing another part of the exemplary contact preparation process of step 47 shown in FIG. 14.
Figure 17:
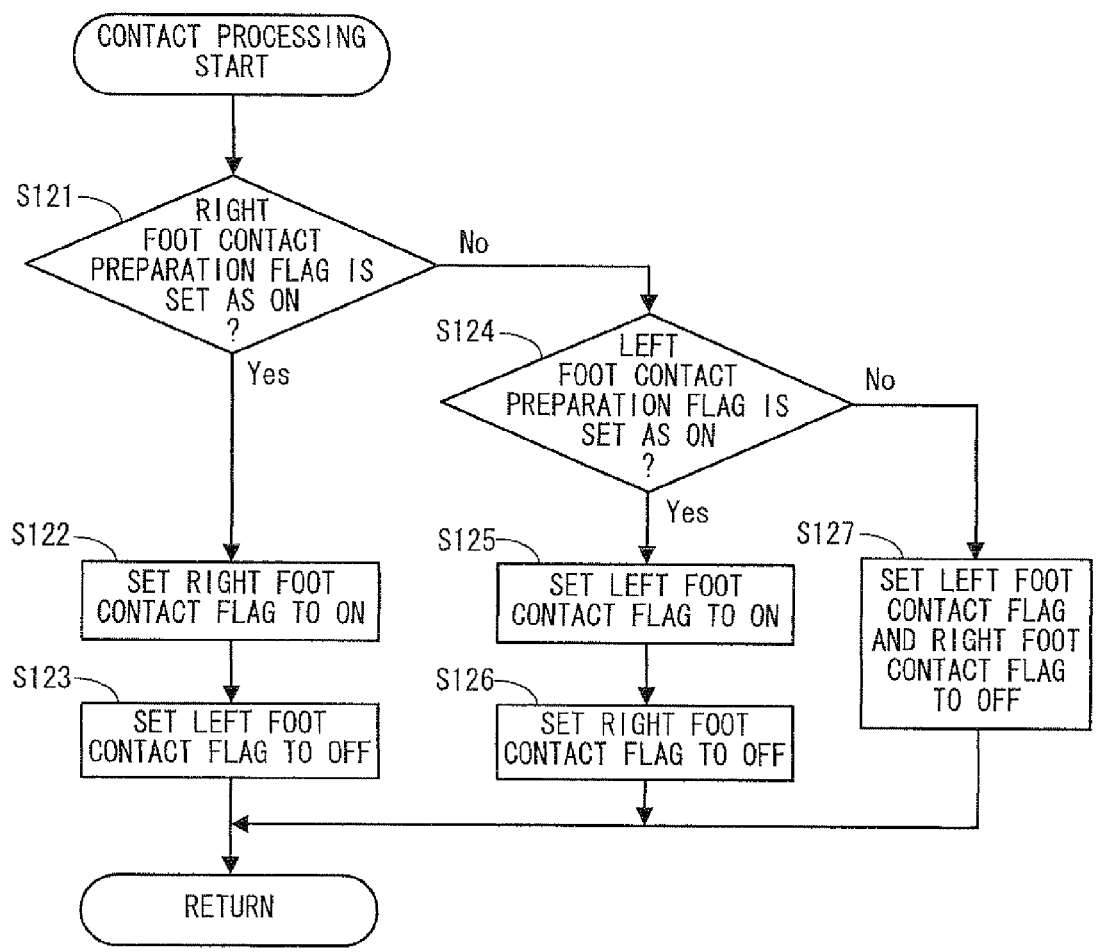
FIG. 17 shows a sub-routine showing an exemplary contact process of step 49 shown in FIG. 14.

Next, with reference to FIG. 14 to FIG. 17, a processing performed by the game apparatus body 5 will be described in detail. FIG. 14 is a flow chart showing an exemplary processing performed by the game apparatus body 5. FIG. 15 shows a sub-routine showing a part of an exemplary contact preparation process of step 47 shown in FIG. 14. FIG. 16 shows a sub-routine showing another part of the exemplary contact preparation process of step 47 shown in FIG. 14. FIG. 17 shows a sub-routine showing an exemplary contact process of step 49 shown in FIG. 14. In the flow charts shown in FIG. 14 to FIG. 17, process steps of the rider object CO moving/stopping the vehicle object GO in the virtual world in accordance with an operation performed by a user will be mainly described among the whole processing, and detailed description of other process steps, which are not directly related to the present invention, is not given. Further, in FIG. 14 to FIG. 17, the respective steps performed by the CPU 10 are abbreviated as "S".

When the game apparatus body 5 is powered on, the CPU 10 of the game apparatus body 5 executes a boot program stored in the ROM/RTC 13, to initialize the respective units such as the main memory. The information processing program stored in the optical disc 4 is loaded to the main memory, and the CPU 10 starts to execute the program. The flow charts shown in FIG. 14 to FIG. 17 are flow charts showing a processing performed after the processing described above is completed As shown in FIG. 14, the CPU 10 performs initialization for the processing in step 41, and advance the process to the subsequent step. For example, in the initialization of step 41, the virtual world is set (for example, the ground object GO, the obstacle object WO, and the like are positioned in the virtual world), and initial locations and initial states of the vehicle object BO, the rider object CO, and the like are set. In a case where the vehicle object BO and the rider object CO are at a stop in the initial state, initialization of afoot of the rider object CO which is to contact the ground in the initial state is performed such that a flag corresponding to the foot is set to ON. For example, in a case where the left foot of the rider object CO contacts the ground object GO in the initial state, the left foot contact preparation flag of the left foot contact preparation flag data De and the left foot contact flag of the left foot contact flag Data Dg are set to ON, and the right foot contact preparation flag of the right foot contact preparation flag data Df and the right foot contact flag of the right foot contact flag Data Dh are set to OFF, in the initialization of step 41. On the other hand, in a case where the right foot of the rider object CO contacts the ground object GO in the initial state, the right foot contact preparation flag of the right foot contact preparation flag data Df and the right foot contact flag of the right foot contact flag Data Dh are set to ON, and the left foot contact preparation flag of the left foot contact preparation flag data De and the left foot contact flag of the left foot contact flag Data Dg are set to OFF, in the initialization of step 41. Further, in the initialization of step 41, the respective parameters used in the subsequent process steps are initialized. For example, the CPU 10 sets parameters indicated by the data Da to Dd, and Di stored in the main memory described above, to initial values, respectively.

Next, the CPU 10 acquires data representing the operation information from the controller 7 in step 42, and advances the process to the subsequent step. For example, the CPU 10 acquires the operation information received from the controller 7, and updates the key data Da1 and the acceleration data Da2 by using the most recent key data and acceleration data included in the operation information.

Next, the CPU 10 calculates the movement speed V of the vehicle object BO in step 43, and advances the process to the subsequent step. For example, the CPU 10 determines whether or not one of the acceleration button or the deceleration button among the operation sections 72 is pressed, based on the key data Da1. The CPU 10 obtains the most recent movement speed V based on the movement speed data Db, and accelerates/decelerates the movement speed V in accordance with the result of determining a pressed button and a condition of the virtual world in which the vehicle object BO is positioned. For example, even when none of the acceleration button and the deceleration button is pressed, the CPU 10 accelerates/decelerates the movement speed V of the vehicle object BO in accordance with a condition of the virtual world in which the vehicle object 20 is positioned. In a first exemplary case, when the vehicle object BO is traveling upward or downward on a slope road, the CPU 10 accelerates or decelerates the movement speed V of the vehicle object BO in accordance with the inclination of the slope road. In a second exemplary case, the CPU 10 decelerates the movement speed V of the vehicle object BO in accordance with a virtual air resistance in the virtual world in which the vehicle object BO and the rider object CO are traveling. In a third exemplary case, the CPU 10 decelerates the movement speed V of the vehicle object BO in accordance with a condition of a road on which the vehicle object BO is traveling. Specifically, the CPU 10 sets a running resistance so as to be increased when the vehicle object BO is traveling on a sand beach as compared to when the vehicle object BO is traveling on an asphalt road, to thereby decelerate the movement speed V of the vehicle object BO. The CPU 10 updates the movement speed data Db based on the movement speed V having been calculated.

Next, the CPU 10 determines a handle direction indicating a direction in which the handle bar of the vehicle object BO is turned, in step 44, and advances the process to the subsequent step. For example, the CPU 10 calculates an orientation (specifically, a tilt of the top surface of the controller 7 relative to the horizontal direction) of the controller 7 by using the acceleration data Da2, and determines the handle direction of the vehicle object BO based on the orientation. Specifically, the CPU 10 estimates a direction of the gravitational acceleration applied to the controller 7 by using an acceleration represented by the acceleration data Da2. For example, as a method for estimating the gravitational acceleration applied to the controller 7, used is, for example, a method for determining, when a magnitude of an acceleration applied to the controller 7 is approximate to a magnitude of the gravitational acceleration, the acceleration as the gravitational acceleration, a method for determining, when a time series difference in acceleration applied to the controller 7 is smaller than or equal to a threshold value (that is, a difference in acceleration represents a value smaller than a predetermined value), the acceleration as the gravitational acceleration, or a method for calculating an acceleration which constantly follows, at a certain rate, an acceleration applied to the controller 7, and determining, as the gravitational acceleration, the acceleration which follows the acceleration applied to the controller 7. However, the gravitational acceleration may be estimated in another appropriate method. The CPU 10 calculates a tilt (angle) of the top surface of the controller 7 relative to the horizontal direction in the real space, by using the direction of the estimated gravitational acceleration applied to the controller 7. For example, as shown in FIG. 8, when the top surface of the controller 7 is tilted leftward (for example, the front portion of the controller 7 having its top surface oriented upward in the real space is lowered relative to the X-axis), the handle direction of the vehicle object BO is determined as the leftward direction, and the handle angle of the vehicle object BO is calculated based on the tilt angle of the top surface of the controller 7 relative to the horizontal direction. On the other hand, when the top surface of the controller 7 is tilted rightward (for example, the rear portion of the controller 7 having its top surface oriented upward in the real space is lowered relative to the X-axis), the handle direction of the vehicle object BO is determined as the rightward direction, and the handle angle of the vehicle object BO is calculated based on the tilt angle of the top surface of the controller 7 relative to the horizontal direction. The CPU 10 updates the handle direction data Dc by using the determined handle direction.

Next, the CPU 10 calculates a positioning location, in the virtual world, of the vehicle object BO in step 45, and advances the process to the subsequent step. For example, the CPU 10 obtains the movement speed V and the handle direction of the vehicle object BO based on the movement speed data Db and the handle direction data Dc, respectively, and obtains the positioning location, in the virtual world, of the vehicle object BO based on the positioning location data Dd. The CPU 10 moves, in the virtual world, the vehicle object BO from the acquired positioning location, and calculates a new positioning location, based on the movement speed V and the handle direction which have been acquired. The CPU 10 updates the positioning location data Dd by using the calculated positioning location.

Next, the CPU 10 determines whether or not the second movement speed V2≤the movement speed V calculated in step 43<the first movement speed V1 is satisfied, in step 46. The first movement speed V1 and the second movement speed V2 are predetermined threshold values which are used for determining whether or not the movement speed V of the vehicle object BO represents a low speed movement. Further, V2<V1 is satisfied. When the movement speed V of the vehicle object BO is higher than or equal to the first movement speed V1, it is determined that the vehicle object BO moves at a high speed. On the other hand, when the movement speed V of the vehicle object BO is lower than the second movement speed V2, it is determined that the vehicle object BO is at a stop. When the second movement speed V2≤the movement speed V<the first movement speed V1 is satisfied, that is, when the vehicle object BO moves at a low speed, the CPU 10 advances the process to step 47. On the other hand, when the movement speed V is higher than or equal to the first movement speed V1, or lower than the second movement speed V2, the CPU 10 advances the process to step 48.

In step 47, the CPU 10 performs a contact preparation process, and advances the process to step 51. Hereinafter, the contact preparation process of step 47 will be described with reference to FIG. 15 and FIG. 16.

As shown in FIG. 15, the CPU 10 determines whether or not the handle direction of the vehicle object BO indicates rightward direction, based on the handle direction data Dc, in step 81. When the handle direction of the vehicle object BO is determined as rightward direction, the CPU 10 advances the process to step 82. On the other hand, it is not determined that the handle direction of the vehicle object BO indicates rightward direction, the CPU 10 advances the process to step 102 (FIG. 16).

In step 82, the CPU 10 determines whether or not the right sides of the vehicle object BO and/or the rider object CO contact another object in the virtual space. For example, the CPU 10 determines that the collisions C4 and C6 (see FIG. 10) defined on the right side of the vehicle object BO in the virtual world are to be used, based on the positioning location data Dd and the collision data Di, and determines whether or not at least one of the collisions C4 and C6 contacts another object (for example, the obstacle object WO) positioned in the virtual world, so that it is determined, based on the determination result, whether or not the right sides of the vehicle object BO an/or the rider object CO contact another object. When the right sides of the vehicle object BO and/or the rider object CO do not contact another object, the CPU 10 advances the process to step 83. On the other hand, when the right sides of the vehicle object BO and/or the rider object CO contact another object (for example, in the state shown in FIG. 12A), the CPU 10 advances the process to step 87.

In step 83, the CPU 10 determines whether or not a time period having elapsed after the contact between the other object and the right sides of the vehicle object BO and/or the rider object CO is shorter than or equal to a predetermined time period (for example, 120 frames (two seconds)). For example, the CPU 10 determines that the determination result of step 83 is affirmative, when the time period having elapsed after release of the contact between the other object and the right sides of the vehicle object BO and/or the rider object CO is shorter than or equal to the predetermined time period. When the time period having elapsed is not shorter than or equal to the predetermined time period, the CPU 10 advances the process to step 84. On the other hand, when the time period having elapsed is shorter than or equal to the predetermined time period, the CPU 10 advances the process to step 87. When the time period having elapsed after the release of the contact between the other object and the right sides of the vehicle object BO and/or the rider object CO is shorter than or equal to the predetermined time period, it is not determined that the right foot can contact the ground, because, for example, when the contact between the other object and the right sides of the vehicle object BO and/or the rider object CO has continued for a substantially short time, an animation in which the rider object CO releases its right foot from the pedal and an animation in which the rider object CO puts its right foot on the pedal are alternately reproduced in every short time period, which is an unnatural animation as a whole, and therefore such an animation needs to be avoided.

In step 84, the CPU 10 determines whether or not the right foot of the rider object CO can contact the ground. For example, the CPU 10 determines that the collision C2 (see FIG. 10) defined on the right side of the vehicle object BO in the virtual world is to be used, based on the positioning location data Dd and the collision data Di, and determines whether or not the collision C2 contacts the ground object GO. For example, when the collision C2 does not contact the ground object GO, and is positioned above the ground object GO, or when the collision C2 contacts a topography object (for example, water surface object) which is determined as an object on which no foot should contact, or when the collision C2 is floating in the air in the virtual world (when, for example, the collision C2 is outside a cliff), the CPU 10 determines that the right foot of the rider object CO cannot contact the ground. On the other hand, when the collision C2 contacts the ground object GO which is determined as an object which can contact a foot (for example, in a state shown in FIG. 11A), the CPU 10 determines that the right foot of the rider object CO can contact the ground, and advances the process to step 85. On the other hand, the CPU 10 determines that the right foot of the rider object CO cannot contact the ground, the CPU 10 advances the process to step 87.

The CPU 10 determines that the right foot of the rider object CO can contact the ground when the vehicle object BO is stopped, and sets the right foot contact preparation flag to ON, and updates the right foot contact preparation flag data Df in step 85. The CPU 10 sets the left foot contact preparation flag to OFF, and updates the left foot contact preparation flag data De in step 86, and ends the process of the subroutine.

On the other hand, when the CPU 10 determines that the right foot of the rider object CO cannot contact the ground in the case of the vehicle object BO being stopped (Yes in step 82, Yes in step 83, or No in step 84), the CPU 10 sets the right foot contact preparation flag to OFF, and updates the right foot contact preparation flag data DF in step 87, and advances the process to the subsequent step.

Next, the CPU 10 determines whether or not the left sides of the vehicle object BO and/or the rider object CO contact another object in the virtual space, in step 88. For example, the CPU 10 determines that the collisions C3 and C5 (see FIG. 10) defined on the left side of the vehicle object BO in the virtual world are to be used, based on the positioning location data Dd and the collision data Di, and determines whether or not at least one of the collisions C3 and C5 contacts another object (for example, the obstacle object WO) positioned in the virtual world, so that it is determined, based on the determination result, whether or not the left sides of the vehicle object BO an/or the rider object CO contact the other object. When the left sides of the vehicle object BO and/or the rider object CO do not contact another object, the CPU 10 advances the process to step 89. On the other hand, when the left sides of the vehicle object BO and/or the rider object CO contact the other object, the CPU 10 advances the process to step 92.

In step 89, the CPU 10 determines whether or not a time period having elapsed after the contact between the other object and the left sides of the vehicle object BO and/or the rider object CO is shorter than or equal to a predetermined time period (for example, 120 frames (two seconds)). When the time period having elapsed is not shorter than or equal to the predetermined time period, the CPU 10 advances the process to step 90. On the other hand, when the time period having elapsed is shorter than or equal to the predetermined time period, the CPU 10 advances the process to step 92.

In step 90, the CPU 10 determines whether or not the left foot of the rider object CO can contact the ground. For example, the CPU 10 determines that the collision C1 (see FIG. 10) defined on the left side of the vehicle object BO in the virtual world is to be used, based on the positioning location data Dd and the collision data Di, and determines whether or not the collision C1 contacts the ground object GO. For example, when the collision C1 does not contact the ground object GO, and is positioned above the ground object GO (for example, in a state shown in FIG. 11A), or when the collision C1 contacts a topography object which is determined as an object on which no foot should contact, or when the collision C1 is positioned in a space in the virtual world so as to contact nothing, the CPU 10 determines that the left foot of the rider object CO cannot contact the ground. On the other hand, when the collision C1 contacts the ground object GO which is determined as an object which can contact a foot, the CPU 10 determines that the left foot of the rider object CO can contact the ground, and advances the process to step 91. On the other hand, when the CPU 10 determines that the left foot of the rider object CO cannot contact the ground, the CPU 10 advances the process to step 92.

The CPU 10 determines that the left foot of the rider object CO can contact the ground when the vehicle object BO is stopped, and sets the left foot contact preparation flag to ON, and updates the left foot contact preparation flag data De in step 91, and ends the process of the sub-routine.

On the other hand, when the CPU 10 determines that the left foot of the rider object CO cannot contact the ground in the case of the vehicle object BO being stopped (Yes in step 88, Yes in step 89, or NO in step 90), the CPU 10 sets the left foot contact preparation flag to OFT, and updates the left foot contact preparation flag data De in step 92, and ends the process of the sub-routine.

When it is determined, in step 81, that the handle direction of the vehicle object BO does not indicate rightward direction, the CPU 10 advances the process to step 102 (FIG. 16). In step 102, the CPU 10 determines whether or not the left sides of the vehicle object BO and/or the rider object CO contact another object in the virtual space. When the CPU 10 determines that the left sides of the vehicle object BO and/or the rider object CO do not contact another object, the CPU 10 advances the process to step 103. On the other hand, when the CPU 10 determines that the left sides of the vehicle object BO and/or the rider object CO contact another object, the CPU 10 advances the process to step 107. A determination method performed in step 102 is similar to that of step 88, and a detailed description is not given.

In step 103, the CPU 10 determines whether or not a time period having elapsed after the contact between the other object and the left sides of the vehicle object BO and/or the rider object CO is shorter than or equal to a predetermined time period. When the time period having elapsed is not shorter than or equal to the predetermined time period, the CPU 10 advances the process to step 104. On the other hand, when the time period having elapsed is shorter than or equal to the predetermined time period, the CPU 10 advances the process to step 107. A determination method performed in step 103 is similar to that of step 89, and a detailed description is not given.

In step 104, the CPU 10 determines whether or not the left foot of the rider object CO can contact the ground. When the CPU 10 determines that the left foot of the rider object CC can contact the ground, the CPU 10 advances the process to step 105. On the other hand, when the CPU 10 determines that the left foot of the rider object CO cannot contact the ground, the CPU 10 advances the process to step 107. A determination method performed in step 104 is similar to that of step 90, and a detailed description is not given.

The CPU 10 determines that the left foot of the rider object CO can contact the ground in the case of the vehicle object BO being stopped, the CPU 10 sets the left foot contact preparation flag to ON, and updates the left foot contact preparation flag data De in step 105. The CPU 10 sets the right foot contact preparation flag to OFF, and updates the right foot contact preparation flag data Df in step 106, and ends the process of the sub-routine.

On the other hand, when the CPU 10 determines that the left foot of the rider object CO cannot contact the ground in the case of the vehicle object BO being stopped (Yes in step 102, Yes in step 103, or No in step 104), the CPU 10 sets the left foot contact preparation flag to OFF, and updates the left foot contact preparation flag data De in step 107, and advances the process to the subsequent step.

Next, the CPU 10 determines whether or not the right sides of the vehicle object BO and/or the rider object CO contact another object in the virtual space, in step 108. When the right sides of the vehicle object BO and/or the rider object CO do not contact another object, the CPU 10 advances the process to step 109. On the other hand, when the right sides of the vehicle object BO and/or the rider object CO contact the other object, the CPU 10 advances the process to step 112. A determination method performed in step 108 is similar to that of step 82, and a detailed description is not given.

In step 109, the CPU 10 determines whether or not a time period having elapsed after the contact between the other object and the right sides of the vehicle object BO and/or the rider object CO is shorter than or equal to a predetermined time period. When the CPU 10 determines that the time period having elapsed is not shorter than or equal to the predetermined time period, the CPU 10 advances the process to step 110. On the other hand, when the CPU 10 determines that the time period having elapsed is shorter than or equal to the predetermined time period, the CPU 10 advances the process to step 112. A determination method performed in step 109 is similar to that of step 83, and a detailed description is not given.

In step 110, the CPU 10 determines whether or not the right foot of the rider object CO can contact the ground. When the CPU 10 determines that the right foot of the rider object CO can contact the ground, the CPU 10 advances the process to step 111. On the other hand, when the CPU 10 determines that the right foot of the rider object CO cannot contact the ground, the CPU 10 advances the process to step 112. A determination method performed in step 110 is similar to that of step 84, and a detailed description is not given.

The CPU 10 determines that the right foot of the rider object CO can contact the ground in the case of the vehicle object BO being stopped, and sets the right foot contact preparation flag to ON, and updates the right foot contact preparation flag data Di in step 111, and ends the process of the sub-routine.

On the other hand, when the CPU 10 determines that the right foot of the rider object CO cannot contact the ground in the case of the vehicle object BO being stopped (Yes in step 108, Yes in step 109, or NO in step 110), the CPU 10 sets the right foot contact preparation flag to OFF, and updates the right foot contact preparation flag data Of in step 112, and ends the process of the sub-routine.

Returning to FIG. 14, when the determination of step 46 is negative, the CPU 10 determines whether or not the movement speed V calculated in step 43 is lower than the second movement speed V2, in step 48. When the CPU 10 determines that the movement speed V is lower than the second movement speed V2, that is, when the vehicle object BO is at a stop, the CPU 10 advances the process to step 49. On the other hand, when the CPU 10 determines that the movement speed V is higher than or equal to the first movement speed V1, that is, when the vehicle object BO moves at a high speed, the CPU 10 advances the process to step 50.

In step 49, the CPU 10 performs a contact process, and advances the process to step 51. Hereinafter, the contact process of step 49 will be described with reference to FIG. 17.

As shown in FIG. 17, the CPU 10 determines whether or not the right foot contact preparation flag is set as ON, based on the right foot contact preparation flag data Df, in step 121. When the CPU 10 determines that the right foot contact preparation flag is set as ON, the CPU 10 advances the process to step 122. On the other hand, the CPU 10 determines that the right foot contact preparation flag is set as OFF, the CPU 10 advances the process to step 124.

In step 122, the CPU 10 sets the right foot contact flag to ON, and updates the right foot contact flag data Dh. The CPU 10 sets the left foot contact flag to OFF, and updates the left foot contact flag data Dg in step 123, and ends the process of the sub-routine.

On the other hand, in step 124, the CPU 10 determines whether or not the left foot contact preparation flag is set as ON, based on the left foot contact preparation flag data De. When the CPU 10 determines that the left foot contact preparation flag is set as ON, the CPU 10 advances the process to step 125. On the other hand, when the CPU 10 determines that the left foot contact preparation flag is set as OFF, the CPU 10 advances the process to step 127.

In step 125, the CPU 10 sets the left foot contact flag to ON, and updates the left foot contact flag data Dg. The CPU 10 sets the right foot contact flag to OFF, and updates the right foot contact flag data Dh in step 126, and ends the process of the sub-routine.

On the other hand, in step 127, the CPU 10 sets each of the left foot contact flag and the right foot contact flag to OFF, and updates the left foot contact flag data Dg and the right foot contact flag data Dh, and ends the process of the sub-routine.

Returning to FIG. 14, when the determination of step 48 is negative, that is, when the vehicle object BO moves at a high speed, the CPU 10 sets, to OFF, each of the left foot contact preparation flag, the right foot contact preparation flag, the left foot contact flag, and the right foot contact flag, and updates the left foot contact preparation flag data De, the right foot contact preparation flag data Of, the left foot contact flag data Dg, and the right foot contact flag data Dh in step 50, and advances the process to step 51.

In step 51, the CPU 10 positions the vehicle object BO and the rider object CO in the virtual world, based on conditions of the vehicle object BO and the rider object CO, which are set in step 43 to step 50, and displays the positioned objects on the monitor 2, and advances the process to the subsequent step. For example, the CPU 10 positions the vehicle object BO and the rider object CO in the virtual world, based on the movement speed V represented by the movement speed data Db, the handle direction represented by the handle direction data Dc, and the positioning location represented by the positioning location data Dd, and displays, on the monitor 2, the virtual world including the vehicle object BO and the rider object CO.

In step 51, when the vehicle object BO moves at a low speed (Yes in step 46) or the vehicle object BO is at a stop (Yes in step 48), the CPU 10 selects a manner in which a foot of the rider object CO is to contact the ground, based on settings of the flags represented by the left foot contact preparation flag data De, the right foot contact preparation flag data Of, the left foot contact flag data Dg, and the right foot contact flag data Dh, and displays the result on the monitor 2. In a first exemplary case, when the vehicle object BO moves at a low speed, and the right foot contact preparation flag is set as ON, the CPU 10 displays a contact preparation state (for example, a state shown in FIG. 9A) preceding a state in which the vehicle object BO is stopped, and, in the contact preparation state, the rider object CO releases its right foot from the pedal of the bicycle (the vehicle object BO), and its right foot contacts the ground object GO so as to stop the vehicle object BO. In a second exemplary case, when the vehicle object BO moves at a low speed, and the left foot contact preparation flag is set as ON, the CPU 10 displays a contact preparation state preceding a state in which the vehicle object BO is stopped, and, in the contact preparation state, the rider object CO releases its left foot from the pedal of the bicycle, and its left foot contacts the ground object GO so as to stop the vehicle object BO. In a third exemplary case, when the vehicle object BO is at a stop, and the right foot contact flag is set as ON, the CPU 10 displays a contact state (for example, a state shown in FIG. 11B) in which the right foot of the rider object CO contacts the ground object GO so as to stop the vehicle object BO. In a fourth exemplary case, when the vehicle object BO is at a stop, and the left foot contact flag is set as ON, the CPU 10 displays a contact state (for example, a state shown in FIG. 12O) in which the left foot of the rider object CO contacts the ground object GO so as to stop the vehicle object BO.

In a case where any foot cannot contact the ground on both sides of each of the vehicle object BO and the rider object CO, even when the vehicle object BO moves at a low speed, or is at a stop, all the flags may be set to OFF. For example, in the virtual world in which the obstacle object WO is positioned near and lateral to one of the right sides and the left sides of the vehicle object BO and the rider object CO, and an edge of a cliff is positioned near and lateral to the other thereof, any foot cannot contact the ground on both sides of each of the vehicle object BO and the rider object CO. In this case, the CPU 10 displays, on the monitor 2, the vehicle object BO and the rider object CO which are not in the contact preparation state and the contact state described above, even when the vehicle object BO moves at a low speed, or at a stop. For example, when any foot cannot contact the ground on both sides of each of the vehicle object BO and the rider object CO, the CPU 10 displays, on the monitor 2, a state in which the bicycle is upright in the virtual world with both feet of the rider object CO put on the pedals of the bicycle (the vehicle object BO).

Next, the CPU 10 determines whether or not the process is to be ended in step 52. The process is to be ended when, for example, a condition for ending the process is satisfied, or a user performs an operation for ending the process. When the process is not to be ended, the CPU 10 returns the process to step 42, and repeats the process steps, and, when the process is to be ended, the CPU 10 ends the process of the flow chart.

In the process described above, the rider object CO which operates the vehicle object BO can be naturally represented. Thus, unnatural representation of the rider object CO can be alleviated.

In the embodiment described above, as a contact determination region (collision) used for determining a foot of the rider object CO which is to contact the ground, six collisions C1 to C6 are used. However, these contact determination regions are only examples. The contact determination regions of other types can be used. For example, seven or more contact determination regions may be defined for the vehicle object BO and/or the rider object CO, or five or less contact determination regions may be defined. Further, in the embodiment described above, the collisions C1 and C2 are defined under the feet of the rider object CO in order to determine the condition of the ground object GO, and the collisions C3 to C6 are defined on both sides of the vehicle object BO in order to determine whether or not an obstacle is present near and lateral to the vehicle object BO. However, needless to say, when only one of the aforementioned determinations may be performed, the collisions C1 and C2, or the collisions C3 to C6 are unnecessary. Specifically, when the condition of the ground object GO only is to be determined in order to determine a foot of the rider object CO which is to contact the ground, it is unnecessary to define the collisions C3 to C6. On the other hand, when only whether or not an obstacle is present near and lateral to the vehicle object BO is determined in order to determine a foot of the rider object CO which is to contact the ground, it is unnecessary to define the collisions C1 and C2. Further, the positions and the number of the collisions C used for determining whether or not an obstacle is present near and lateral to the vehicle object BO may be changed depending on the shape of the vehicle object BO. For example, when the vehicle object BO has a shape as shown in FIG. 10, an obstacle near and lateral to the vehicle object BO may be determined by using only the collisions C3 and C4 defined on both ends of the handle bar. Furthermore, the contact determination region used for determining a foot of the rider object CO which is to contact the ground may have, for example, an invisible column shape or spherical shape. However, the shape of the contact determination region is not limited thereto. For example, when the vehicle object BO and the rider object CO are moved in a three-dimensional virtual world, the shape of the contact determination region defined therein can be selected from various three-dimensional shapes.

In the above description, a foot of the rider object CO which is to contact the ground in the three-dimensional virtual space is determined based on the contact determination result. The present invention can be used also when a foot of the rider object CO is to contact the ground in a two-dimensional virtual world. Needless to say, when the vehicle object BO and the rider object CO are moved in the two-dimensional virtual world, the shape of the contact determination region may be selected from various figures (for example, a circle).

In the above description, the acceleration sensor 701 for detecting for an acceleration in the three-axial directions is used. However, the controller 7 may be provided with an acceleration sensor capable of detecting for an acceleration in at least one axial direction. For example, when the acceleration sensor 701 capable of detecting for an acceleration in the Z-axial direction (see FIG. 8) is used, whether or not the controller is in the horizontal position can be determined based on whether or not 1 G (gravitational acceleration) is applied in the Z-axial direction. In addition, the degree of the tilting of the controller 7 relative to the horizontal direction can be determined based on a magnitude of the acceleration applied in the Z-axial direction.

In the above description, when, for example, the acceleration button or the deceleration button among the operation sections 72 is pressed, the movement speed V of the vehicle object BO is changed. The movement speed V of the vehicle object BO may be changed in accordance with another operation. For example, in a game system including an input device (load controller) having a load sensor to which a load is to be applied by a user, the movement speed V may be changed in accordance with a load being changed by a user moving forward, backward, rightward, or leftward on the input device, or by a user repeatedly treading on the input device, or by a user stepping on and off the input device. Further, the acceleration sensor 701 may detect for change of an acceleration generated when a user shakes the controller 7, and the movement speed V may be changed in accordance with the acceleration being changed.

Moreover, in the above description, the handle angle of the vehicle object BO is changed in accordance with an orientation (tile angle) of the controller 7. However, the handle angle of the vehicle object BO may be changed in accordance with another operation. For example, the handle angle of the vehicle object BO may be changed in accordance with a direction indication button (for example, the cross key 72*a*) among the operation sections 72 being pressed.

The present invention can be used when an exercise assistance program for assisting a user with an exercise by causing the user of the game apparatus 3 to operate an input device such as the controller 7 is executed. However, the present invention may be used for information processing other than the assistance in exercise. For example, the present invention may be used for, for example, a game in which an object in the virtual game world is controlled in accordance with an input device such as the controller 7 being operated.

Furthermore, in the above description, a user controls, by using the controller 7, a rider traveling on a bicycle in the virtual world. The present invention may be used when another object is controlled. For example, a user may control, by using the controller 7, a rider traveling on a two-wheel vehicle such as a motorcycle in the virtual world. Also in this case, a foot of a rider which is to contact the ground when the other two-wheel vehicle such as a motorcycle stops can be selected by using the present invention.

Further, in the above description, the present invention is applied to a stationary game apparatus. However, the present invention is applicable to an information processing apparatus such as a standard personal computer. Further, the present invention is applicable to an information processing system including a plurality of information processing devices. In this case, each information processing device is a component corresponding to a part of the present invention, and the information processing system includes the whole components of the present invention.

Moreover, in the above description, connection between the controller 7 and the game apparatus body 5 is made by wireless communication. However, the connection between the controller 7 and the game apparatus body 5 may be electrically made by using a cable. In this case, the cable connected to the controller 7 is connected to a connection terminal of the game apparatus body 5.

In addition, the shape of the controller 7, and the shapes, the number, and the positions of the operation sections 72, as described above, which are included in the controller 7, are only examples. Needless to say, other shapes, number, and positions may be used in the present invention. Further, the coefficients, the threshold values, the mathematical expressions, the order of the process steps, and the like which are used in the processing described above are only examples. Needless to say, other values, mathematical expressions, the order of process steps, and the like may be used for the present invention.

Further, the information processing program according to the present invention may be supplied to the game apparatus body 5 through a wired or wireless communication line as well as through an external storage medium such as the optical disc 4. Furthermore, the information processing program may be previously stored in a non-volatile storage device included in the game apparatus body 5. The information storage medium for storing the information processing program includes a CD-ROM, a DVD, a storage medium such as an optical disc, a non-volatile semiconductor memory, or the like.

While the invention has been described in detail, the foregoing description is in all aspects illustrative and not restrictive. It is understood that numerous other modifications and variations can be devised without departing from the scope of the invention. It should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any conflict, the present specification (including meanings defined herein) has priority.

Further, throughout the specification, it is understood that terms in singular form should include a concept of plurality. Thus, it should be understood that articles or adjectives indicating the singular form (for example, "a", "an", "the", and the like in English) include the concept of plurality unless otherwise specified.

The storage medium having the information processing program stored therein and the information processing apparatus according to the present invention are capable of alleviating an unnatural representation of a rider object by representing a natural state of the rider object, and are useful as, for example, an exercise assistance apparatus and an exercise assistance program that assists a user with exercise by causing the user to control an input device, and are further useful as, for example, a game apparatus and a game program for executing a game and the like in accordance with a user performing an operation.

What is claimed is:

1. A non-transitory computer-readable storage medium having stored therein an information processing program which, when executed by a computer of an information processing apparatus for displaying a virtual world by using a display device, causes the computer to perform operations comprising:
moving, in accordance with a user performing an operation, a moving object including a vehicle object, and a rider object riding the vehicle object, the vehicle object and the rider object being positioned in the virtual world;
defining at least one contact determination region in the virtual world for the moving object;
determining a contact in the virtual world by using the at least one contact determination region irrespective of contact between the user and objects in real space;
selecting a foot, of the rider object, which is to contact a contact object positioned in the virtual world, in accordance with a determination result from said determining, and performing control such that the selected foot contacts the contact object; and
displaying the moving object by using the display device.

2. The non-transitory computer-readable storage medium according to claim 1, wherein the selecting a foot, and the performing control such that the selected foot contacts the contact object are performed when the moving object is stopped.

3. The non-transitory computer-readable storage medium according to claim 1, wherein the determining a contact comprises determining whether or not a first contact determination region from the at least one contact determination region contacts the contact object, and
wherein the selecting a foot comprises determining responsive to a determination that the first contact determination region contacts the contact object, a foot which is to contact the contact object, and performing control such that the selected foot contacts the contact object.

4. The non-transitory computer-readable storage medium according to claim 1,
wherein the selecting a foot comprises
performing control, responsive to a determination that one of a plurality of first contact determination regions from the at least one contact determination region defined for the moving object contacts the contact object, such that a foot of the rider object contacts the contact object, the foot of the rider object corresponding to the one of the plurality of first contact determination regions, and
performing control, responsive to a determination that a region which is among the plurality of first contact determination regions and is other than the one of the plurality of first contact determination regions defined for the moving object contacts the contact object, such that a foot of the rider object contacts the contact object, the foot of the rider object corresponding to the region other than the one of the plurality of first contact determination regions.

5. The non-transitory computer-readable storage medium according to claim 1,
wherein the defining at least one contact determination region comprises defining at least one first contact determination region on each of a right side and a left side of the moving object, and
wherein the selecting a foot comprises at least one of
performing control, responsive to a determination that the first contact determination region defined on the left side of the moving object contacts the contact object, such that a left foot of the rider object contacts the contact object, and
performing control, responsive to a determination that the first contact determination region defined on the right side of the moving object contacts the contact object, such that a right foot of the rider object contacts the contact object.

6. The non-transitory computer-readable storage medium according to claim 5, wherein the defining at least one contact determination region comprises selecting in accordance with a condition of the moving object in the virtual world, one of the first contact determination region on the right side and the first contact determination region on the left side, and determining whether or not the selected one of the first contact determination region contacts the contact object.

7. The non-transitory computer-readable storage medium according to claim 6, wherein, when the selected one of the first contact determination region does not contact the contact object, the determining a contact comprises determining whether or not the other of the first contact determination region on the right side and the first contact determination region on the left side contacts the contact object.

8. The non-transitory computer-readable storage medium according to claim 6,
wherein the moving a moving object comprises controlling a direction in which the moving object moves, in accordance with a user performing an operation, and
wherein the determining a contact further comprises selecting, from the at least one contact determination region, the first contact determination region used for contact determination, based on the direction in which the moving object moves.

9. The non-transitory computer-readable storage medium according to claim 3, wherein the defining at least one contact determination region comprises defining the first contact determination region on a right lower side position of the moving object, and the first contact determination region on a left lower side position of the moving object, such that the first contact determination region on the right lower side position, and the first contact determination region on the left lower side position are constantly positioned horizontally in the virtual world.

10. The non-transitory computer-readable storage medium according to claim 3,
wherein the defining at least one contact determination region comprises defining a plurality of first contact determination regions for the moving object, and
wherein the determining a contact comprises selecting one of the plurality of the first contact determination region in accordance with a condition of the moving object in the virtual world, and determining whether or not the selected one of the plurality of the first contact determination region contacts the contact object.

11. The non-transitory computer-readable storage medium according to claim 10,
wherein the moving a moving object comprises controlling a direction in which the moving object moves, in accordance with a user performing an operation, and
wherein determining a contact further comprises selecting, from the plurality of the first contact determination region, the first contact determination region used for contact determination, based on the direction in which the moving object moves.

12. The non-transitory computer-readable storage medium according to claim 3,
wherein the contact object has an attribute indicating whether or not a foot of the rider object is allowed to contact the contact object,
wherein the determining a contact further comprises determining whether or not the first contact determination region contacts the contact object having the attribute indicating that the foot of the rider object is allowed to contact the contact object, and
wherein the selecting a foot further comprises selecting, when it is determined that the first contact determination region contacts the contact object having the attribute indicating that the foot of the rider object is allowed to contact the contact object, a foot which is to contact the contact object, and performing control such that the selected foot contacts the contact object.

13. The non-transitory computer-readable storage medium according to claim 1,
wherein the determining a contact comprises determining whether or not at least one second contact determination region contacts a visible or an invisible obstacle object in the virtual world, and
wherein the selecting a foot comprises selecting, when it is determined that the at least one second contact determination region does not contact the obstacle object, a foot which is to contact the contact object, and performing control such that the selected foot contacts the contact object.

14. The non-transitory computer-readable storage medium according to claim 13,
wherein the defining at least one contact determination region comprises defining at least one of the at least one second contact determination region on each of a right side and a left side of the moving object, and
wherein the selecting a foot operation further comprises:
performing control, when it is determined that the second contact determination region defined on the left side of the moving object contacts the obstacle object, such that a right foot of the rider object contacts the contact object, and
performing control, when it is determined that the second contact determination region defined on the right side of the moving object contacts the obstacle object, such that a left foot of the rider object contacts the contact object.

15. The non-transitory computer-readable storage medium according to claim 1, the operations further comprising:
calculating a movement speed at which the moving object moves in the virtual world; and
determining whether or not the movement speed is higher than or equal to a first threshold value,
wherein the selecting a foot comprises selecting, when the movement speed is lower than the first threshold value, a foot, of the rider object, which is to contact the contact object positioned in the virtual world, in accordance with a determination result from said determining a contact.

16. The non-transitory computer-readable storage medium according to claim 15,
wherein the determining whether or not the movement speed is higher than or equal to a first threshold value operation comprises further determining whether or not the movement speed is lower than a second threshold value which is lower than the first threshold value, and
wherein the selecting a foot comprises:
selecting, when the second threshold value is lower than or equal to the movement speed which is lower than the first threshold value, a foot, of the rider object, which is to contact the contact object positioned in the virtual world, in accordance with a determination result from the determining a contact, and causing the rider object to perform a preparation to stop the moving object operation in which the selected foot contacts the contact object; and
selecting, when the movement speed is lower than the second threshold value, a foot, of the rider object, which is to contact the contact object positioned in the virtual world, in accordance with a determination result from the determining a contact, and performing control such that the selected foot contacts the contact object.

17. An information processing apparatus for displaying a virtual world by using a display device, the information processing apparatus comprising:
a processing system including at least one processor;
a movement unit configured to control the processing system to move, in accordance with a user performing an operation, a moving object including a vehicle object, and a rider object riding the vehicle object, the vehicle object and the rider object being positioned in the virtual world;
a contact determination region defining unit configured to control the processing system to define at least one contact determination region in the virtual world for the moving object;
a contact determination unit configured to control the processing system to determine a contact in the virtual world by using the at least one contact determination region irrespective of contact between the user and objects in real space;
a contact action control unit configured to control the processing system to select a foot, of the rider object, which is to contact a contact object positioned in the virtual world, in accordance with a determination result of the contact determination unit, and to perform control such that the selected foot contacts the contact object; and a display control unit configured to control the processing system to display the moving object in the display device.

18. An information processing method for displaying a virtual world by using a display device, the information processing method comprising:

moving, using at least one processor and in accordance with operations performed by a user, a moving object including a vehicle object, and a rider object riding the vehicle object, the vehicle object and the rider object being positioned in the virtual world;

defining at least one contact determination region in the virtual world for the moving object;

determining a contact in the virtual world by using the at least one contact determination region irrespective of contact between the user and objects in real space;

selecting, using at least one processor, a foot, of the rider object, which is to contact a contact object in the virtual world, in accordance with the determined contact, and perform control such that the selected foot contacts the contact object; and displaying the moving object in the display device.

19. The information processing method according to claim 18, wherein the determining a contact comprises determining whether or not at least one second contact determination region contacts a visible or an invisible obstacle object in the virtual world, and wherein the selecting a foot comprises selecting, when it is determined that the at least one second contact determination region does not contact the obstacle object, a foot which is to contact the contact object, and performing control such that the selected foot contacts the contact object.

20. The information processing apparatus according to claim 17, wherein the determining a contact comprises determining whether or not at least one second contact determination region contacts a visible or an invisible obstacle object in the virtual world, and wherein the selecting a foot comprises selecting, when it is determined that the at least one second contact determination region does not contact the obstacle object, a foot which is to contact the contact object, and performing control such that the selected foot contacts the contact object.

* * * * *